(12) United States Patent
Plesko

(10) Patent No.: US 6,641,043 B1
(45) Date of Patent: *Nov. 4, 2003

(54) ARTICULATED SCAN ELEMENTS WITH ELASTOMERIC HINGES, AND METHODS FOR MANUFACTURE OF SAME

(75) Inventor: George A. Plesko, Media, PA (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/641,140

(22) Filed: Aug. 17, 2000

Related U.S. Application Data

(63) Continuation of application No. 09/286,577, filed on Apr. 5, 1999, now Pat. No. 6,173,895.

(51) Int. Cl.[7] .................................................. G06K 7/10
(52) U.S. Cl. .............................. 235/462.33; 235/462.36
(58) Field of Search ........................ 235/462.01, 462.33, 235/462.36, 462.38, 462.4, 462.45, 472.01

(56) References Cited

U.S. PATENT DOCUMENTS

| | | | |
|---|---|---|---|
| 4,593,186 A | 6/1986 | Swartz et al. | |
| 5,099,110 A | 3/1992 | Shepard et al. | |
| 5,392,151 A * | 2/1995 | Neson | 359/223 |
| 5,422,471 A * | 6/1995 | Pllesko | 235/467 |
| 5,479,000 A | 12/1995 | Dvorkis et al. | |
| 5,559,319 A * | 9/1996 | Peng | 235/462.01 |
| 5,594,232 A | 1/1997 | Giordano | |
| 5,596,446 A | 1/1997 | Plesko | |
| 5,693,929 A * | 12/1997 | Dvorkis et al. | 235/454 |
| 5,804,809 A | 9/1998 | Eastman et al. | |
| 6,173,895 B1 * | 1/2001 | Plesko | 235/462.33 |
| 6,311,894 B1 * | 11/2001 | Miyajima et al. | 235/462.36 |

* cited by examiner

*Primary Examiner*—Daniel St. Cyr
(74) *Attorney, Agent, or Firm*—Kirschstein et al.

(57) ABSTRACT

A flexible scan element for scanning a light beam, and methods for making and actuating the scan element. The scan element includes a first leaf that is rigidly affixed to a substrate, a second leaf having a mirror affixed thereto, and a flexible hinge that couples the first leaf to the second leaf. The second leaf is moveable and pivots about an axis of the flexible hinge. The first leaf is coupled to the second leaf solely by the flexible hinge, and the flexible hinge is formed solely from an elastomer material. The first and second leaves are preferably formed from flat rigid metal, and optionally include bonding flanges that couple the leaves to the elastomeric hinge forming material. The mirror is affixed on one side of the second leaf and a magnet is optionally affixed on the opposite side of the second leaf. The scan element optionally includes tabs for mounting the device to a flat substrate or circuit board, and, in one embodiment has a resonant frequency in the range of 20 Hz–100 Hz.

18 Claims, 16 Drawing Sheets

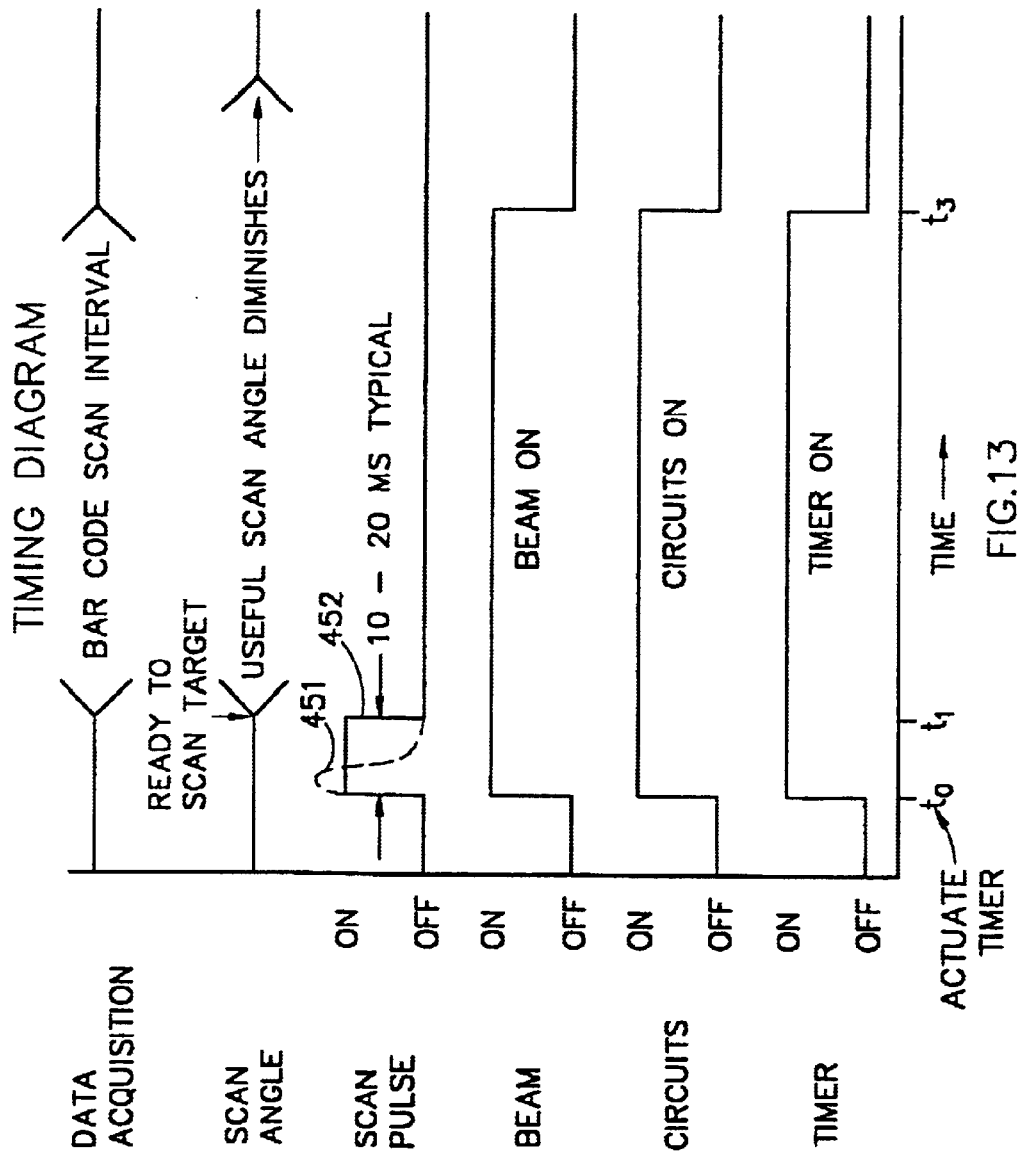

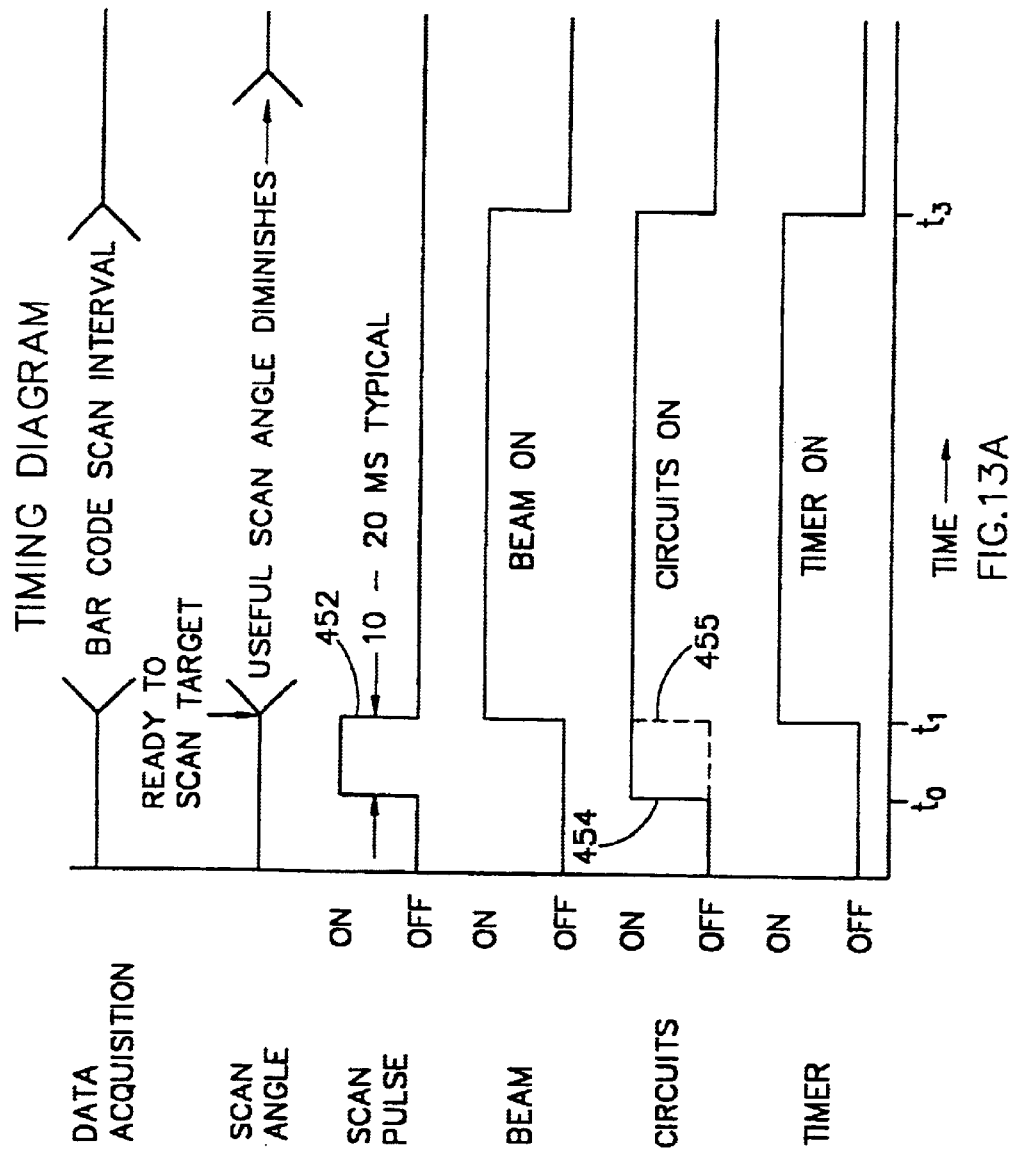

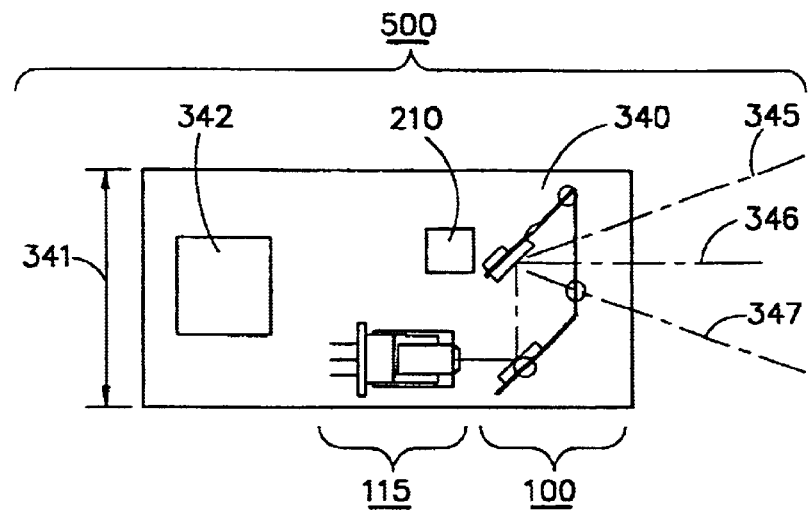
FIG. 16
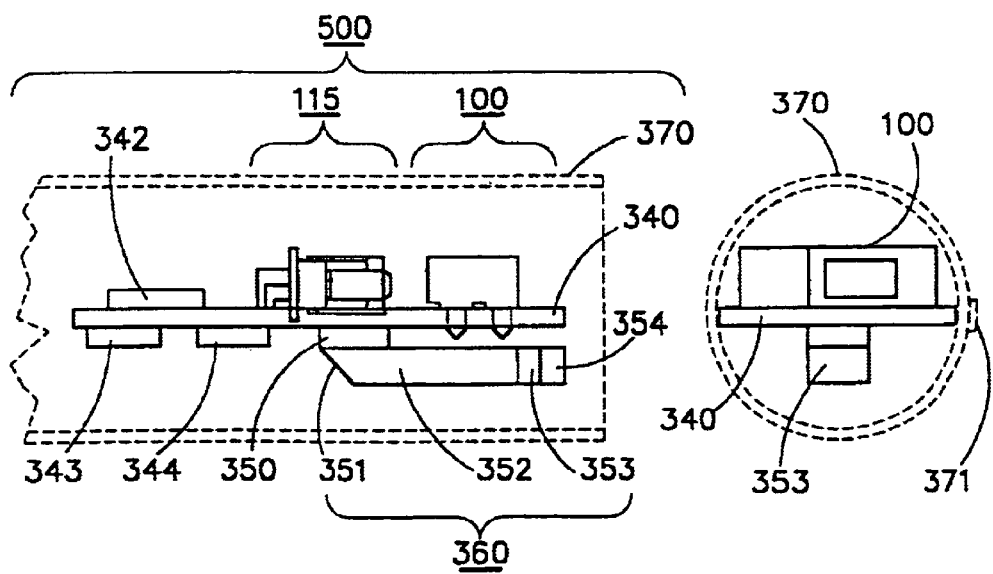
FIG. 17
FIG. 17A

ARTICULATED SCAN ELEMENTS WITH ELASTOMERIC HINGES, AND METHODS FOR MANUFACTURE OF SAME

CROSS-REFERENCE TO RELATED APPLICATIONS

This application is a continuation of U.S. patent application Ser. No. 09/286,577, filed Apr. 5, 1999, now U.S. Pat. No. 6,173,895.

BACKGROUND OF THE INVENTION

I. Field of the Invention

The present invention relates to optical scanning and reading equipment and, in particular, to systems for scanning a light beam across a target such as a bar code symbol.

II. Description of the Related Art

In a light beam scanner, a small spot of light is swept rapidly across a target such as a bar code symbol. After reflection from the target, a photoelectric converter such as a photo diode detects the reflected light and converts it to electronic signals representing features of the target. A bar code scanner is an important commercial application for beam scanners and is referred to herein as a typical example of a specific application for the present invention.

Various mechanisms exist in the prior art for sweeping (or scanning) a light beam across a target. One such prior art mechanism is shown in FIG. 9. In the mechanism of FIG. 9, a coil 145 wound on bobbin 146 is attached to a steel mounting frame 148. Steel rivets with heads 147a and 147b act as poles for coil 145. A scan element 149a has a fixed end 149b mounted to mount 149 which in turn is fastened to a scanner chassis. The scan element 149a is a laminated structure made from flexible copper clad printed circuit stock. The laminated structure at the fixed end has copper layer 133 laminated to flexible plastic film 135 (e.g. polyamide film) also laminated to copper layer 136 which is in turn affixed to mounting bracket 149. The flexible end 149c of the scan element includes copper layer 131 laminated to film layer 135 which in turn is laminated to copper layer 138. Flexible film layer 135 holds the fixed end 149b and the flexible end 149c of the scan element together.

The scan element shown in FIG. 9 includes an open area 137 that is formed by etching away a portion of copper between layer sections 138 and 136. The area immediately above area 137 is also been formed by etching the copper away between copper layer sections 133 and 131 and back filling this area with an elastomer fill 132. Mirror 134 is attached to copper layer 131 and magnet 140 is attached to copper layer 138. Magnet 140 causes mirror 134 to dither in the direction of double arrow 139 when acted upon by current introduced into coil 145. In the scan mechanism of FIG. 9, film layer 135 is a permanent part of the structure and is substantially thick (i.e., on the order of 0.030") imparting stiffness to the flexural characteristics of the device. Since film layer 135 acts as a stiffening layer, this structure must be made relatively large and heavy in order to achieve slow scan rates on the order of 20 Hz. Furthermore, the stiffening effect of plastic layer 135 reduces the Q of the system and acts as a damper so that many oscillations cannot be maintained by the introduction of only a single current pulse in coil 145. As described more fully below, one object of the present invention is to overcome this problem by providing a scan system wherein sufficient oscillations can be maintained by introduction of only a single current pulse in the drive coil or by application of some other momentary distortion force to the system.

Due to the relatively high rigidity of film layer 135, coil 145 must be large with an iron core having pole faces to sufficiently act upon magnet 140. Furthermore, mass manufacture of the device of FIG. 9 requires a significant number of steps and components. As described more fully below, it is a further object of the present invention to provide a scan system which does not require such a large coil and which can be mass manufactured more easily and cost efficiently than the mechanism of FIG. 9.

U.S. Pat. No. 4,593,186 entitled "Portable Laser Scanning System and Scanning Methods" discloses a portable laser scanning system for reading bar code symbols. The system includes means for generating and directing a laser beam, scanning means for scanning the laser beam across a symbol, sensor means for detecting light reflected from the symbol and generating a signal, signal processing means for processing the signal, decoding means for decoding the signal, manually actuatable trigger means for initiating each reading of the symbol, power supply means, and means for determining a successful decoding of each symbol and for non-manually terminating the reading of each symbol after a successful decode. Alternatively, the system includes means for determining that a symbol has not been successfully decoded and for non-manually terminating the reading of the symbol if the symbol has not been successfully decoded after a predetermined amount of time. Thus, in the system of the '186 patent, the deactuation of the scan system depends, at least in part, on a determination as to whether a symbol has been successfully decoded. In the present invention the determination as to whether the symbol has been successfully decoded or not is not necessary in order to properly and efficiently deactuate a scanning system. It is thus an object of the present invention to provide an improved and simpler sequence for actuating and deactuating the elements in a scan system which functions independently of any determination that the symbol has been successfully or unsuccessfully decoded. In doing so the benefits are significant, among these are: less battery energy needed, easier to use, fewer components needed, lower assembly costs, less space required to mount the scanner and quicker scan sequences.

The scan systems disclosed in the '186 patent also include motors that must be supplied power continuously during the entire scan sequence. To conserve power the motors are shut down in response to, for example, determinations that the symbol has or has not been successfully decoded. As will be explained more fully below, it is a further object of the present invention, to provide an actuation sequence that is more efficient than that described in the '186 patent, and which does not require continuous power to the scan element during the entire scan sequence.

SUMMARY OF THE INVENTION

The present invention is directed to a flexible scan element for scanning a light beam. The scan element includes a first leaf that is rigidly affixed to a substrate, a second leaf having a mirror affixed thereto, and a flexible hinge that couples the first leaf to the second leaf. The second leaf is moveable and pivots about an axis of the flexible hinge. The first leaf is coupled to the second leaf by the flexible hinge which is formed solely from an elastomer material. The first and second leaves are preferably formed from flat rigid metal, and optionally include bonding flanges that couple the leaves to the elastomeric material. The mirror is affixed on one side of the second leaf and a magnet is optionally affixed on the opposite side of the second leaf. The scan element optionally includes tabs for mounting the device to a flat substrate or circuit board, and, in one embodiment has a resonant frequency in the range of 20 Hz–100 Hz.

In accordance with a further aspect, the present invention is directed to a flexible scan element that includes a first leaf that is rigidly affixed to a substrate, a second leaf having a mirror affixed thereto, and a flexible hinge that couples a first end of the first leaf to a first end of the second leaf. The second leaf is moveable and pivots about an axis of the flexible hinge. In accordance with this further aspect, a gap separates the first end of the first rigid leaf from the first end of the second rigid leaf, and the gap has a minimum width that ranges from 3–20 mils. In a particularly preferred embodiment, the gap has a width of about 7 mils.

In accordance with a still further aspect, the present invention is directed to a flexible scan element that includes a first leaf that is rigidly affixed to a substrate, a second leaf having a mirror affixed thereto, and a flexible hinge that couples a first end of the first leaf to a first end of the second leaf. The second leaf is moveable and pivots about an axis of the flexible hinge. In accordance with this further aspect, the flexible hinge may be located within as little as 0.002 inches of the mirror. In alternate embodiments, the distance between the hinge axis and the mirror ranges from 0.003 inches to 0.03 inches.

In accordance with a further aspect, the present invention is directed to a method for manufacturing a flexible scan element. First and second leaves are formed from flat metal such that a gap exists between the first leaf and the second leaf. The first leaf and the second leaf with the gap therebetween are positioned on a flat surface. Next, a flexible hinge is formed in the gap by applying a flowable elastomer to the gap. After the elastomer has cured, the first and second leaf with the elastomer therebetween are separated from the flat surface.

In a particularly preferred manufacturing method, a frame having a plurality of aligned pairs of leaves is formed. Each of the aligned pairs includes a first leaf of flat metal and a second leaf of flat metal having a gap therebetween, and the gaps associated with the aligned pairs are aligned along a straight line. The frame is then translated relative to an application tip that applies flowable elastomer along the straight line. Automated pick and place machinery is then optionally used to affix mirrors and magnets to selected leaves while they are still in the frame. After the elastomer has cured, finished hinge elements are removed from the frame by detaching the leaves from frame runners along the edges of the frame.

In accordance with a still further aspect, the present invention is directed to a chassis for use in forming a scan element for scanning a light beam. The chassis includes a first moveable leaf that is secured to a first fixed leaf by a first hinge, a second fixed leaf that is adjacent to the first fixed leaf, and a third fixed leaf that is adjacent to the second fixed leaf such that the second fixed leaf is positioned between the first and third fixed leaves. The first, second and third fixed leaves are formed from a single sheet of flat metal having first and second bending grooves. The first bending groove separates the first fixed leaf from the second fixed leaf, and the second bending groove separates the second fixed leaf from the third fixed leaf. In order to configure the chassis to scan a light beam in one-dimension, a first mirror is affixed to the first moveable leaf and a second mirror is affixed to the third fixed leaf. In accordance with a further embodiment useful for two-dimensional scanning, the chassis further includes a second moveable leaf coupled to the third fixed leaf by a second hinge, wherein the second hinge has an axis that is perpendicular to an axis of the first hinge. In this further embodiment, a first mirror is affixed to the first moveable leaf and a second mirror affixed to the second moveable leaf.

In accordance with a still further aspect, the present invention is directed to a method for actuating a hand-held portable scan system with force supplied by a user of the system. In this method, a user holds a hand-held portable scan system in the user's hand. The scan system includes a scan element with a mirror that pivots about an axis. The user then depresses (with the user's finger or thumb) a switch on a housing of the portable scan system. Energy associated with movement of the user's finger or thumb during depression of the switch supplies a mechanical impact force to the scan element that causes the mirror to pivot about the axis. In one embodiment, the switch is a mechanical tactile switch.

In accordance with yet a further aspect, the present invention is directed to a method for actuating a scan system using a single non-periodic actuation pulse. A moveable fixture having a mirror and a magnet affixed thereto is provided. The moveable fixture pivots about an axis. A laser that directs a light beam at the mirror is also provided, and a coil is positioned proximate to the magnet. The coil is energized with a single non-periodic pulse of dc current. The single non-periodic pulse results in the application of a distortion force to the magnet that is sufficient to cause the mirror to scan the light beam through a scan angle range that is large enough to illuminate a bar code symbol. The pulse is preferably on the order of about 10–20 milliseconds in duration, and preferably functions to pull the magnet to the coil.

In accordance with a further aspect, the present invention is directed to a method for reading a bar code symbol using scan oscillations that gradually diminish in amplitude. In this method, the bar code symbol is illuminated with a scanning light beam during a plurality of oscillation cycles of the scanning light beam. The scanning light beam has an angular scan range that gradually diminishes with each successive one of the plurality of oscillation cycles. While the scan range of the oscillation cycles is diminishing, reflected light is received from the bar code symbol, and then converted to an electrical signal that is used to decode the bar code symbol.

In accordance with a further aspect, the present invention is directed to a low energy method for actuating a scan system. The scan system includes a moveable fixture having with a mirror affixed thereto, wherein the moveable fixture pivots about an axis, and a laser that directs a light beam at the mirror. A distortion force is applied to the moveable fixture at a first time associated with actuation of the scan system by a user. The distortion force may be supplied from a magnetic coil that is pulse upon actuation of the system. Alternatively, depression of a tactile switch by the user may result in the application of a mechanical distortion force to the moveable fixture. The laser is turned on for a predetermined period of time that expires after the first time, and the laser off is turned off at the expiration of the predetermined period of time. The laser remains on during the predetermined period of time and is turned off at the expiration of the predetermined period of time irrespective of whether a bar code symbol is successfully decoded during the predetermined period of time.

In accordance with still another aspect, the present invention is directed to incorporation of the novel articulated scan elements of the present invention into very compact housings such as those shaped like a pen or a card like a PCMCIA computer card, and the integration of such a scanner into portable hand hold able data collection terminals.

BRIEF DESCRIPTION OF THE DRAWINGS

The features, objects, and advantages of the present invention will become more apparent from the detailed description set forth below when taken in conjunction with the drawings.

FIG. 13 is a timing diagram showing a novel low energy actuation sequence for operating scan systems of the present invention wherein a single non-periodic pulse drives the oscillation of the scan element.

FIG. 13A is a timing diagram showing an alternate low energy actuation sequence for operating scan systems of the present invention wherein a single non-periodic pulse drives the oscillation of the scan element and the laser is turned on after the drive pulse ends.

FIG. 16 shows a top view of a narrow and low profile articulated scan system mounted on a small circuit board which fits into a pen size non-contact bar code reader, in accordance with the present invention.

FIG. 17 is a side view of the device of FIG. 16 showing the position of the light collection element of the scan system within a pen size non-contact bar code reader.

FIG. 17A is a front view of the device of FIG. 17.

DETAILED DESCRIPTION OF THE INVENTION

Various light beam scan systems and methods for manufacturing such systems are described in detail herein. In the following description, numerous specific details are set forth in order to provide a thorough understanding of the present invention. One skilled in the relevant art, however, will readily recognize that the present invention can be practiced without these specific details. In other instances, known structures are not shown or described in detail in order to avoid obscuring the present invention.

Articulated Scan Element

Figure 3:
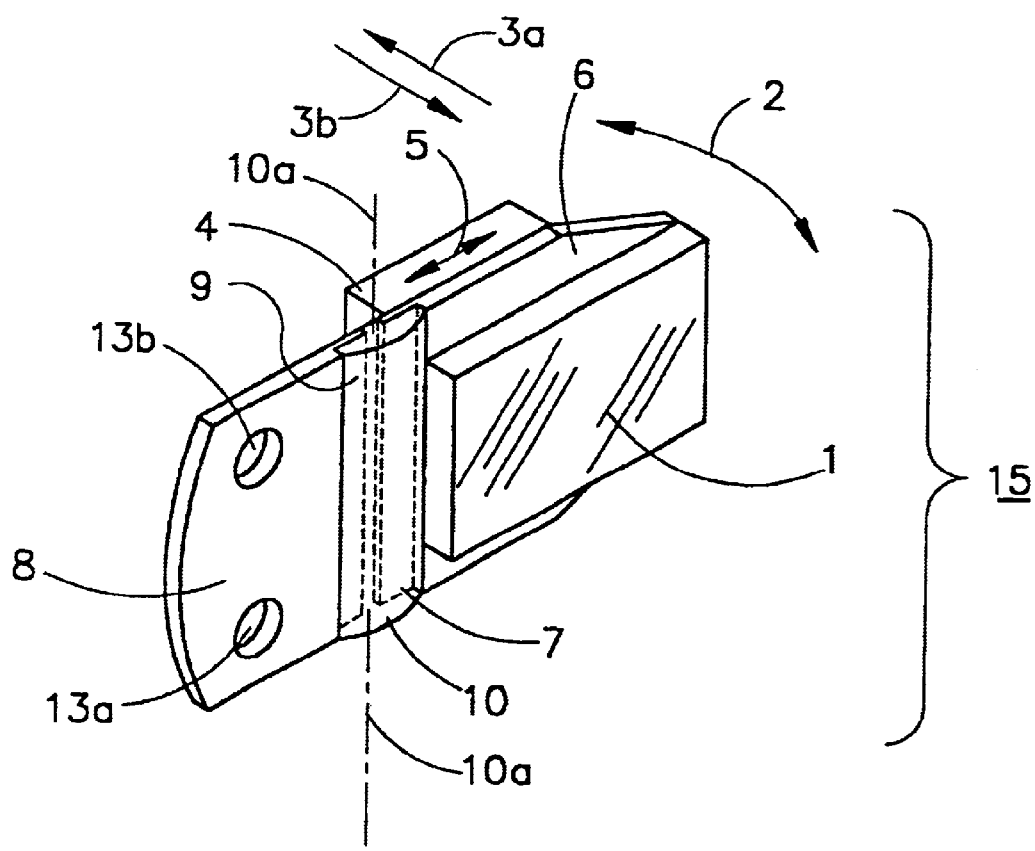
FIG. 3 shows further details of the articulated leaves and the elastomeric hinge used to form the articulated scan element of FIG. 1.
Figure 4:
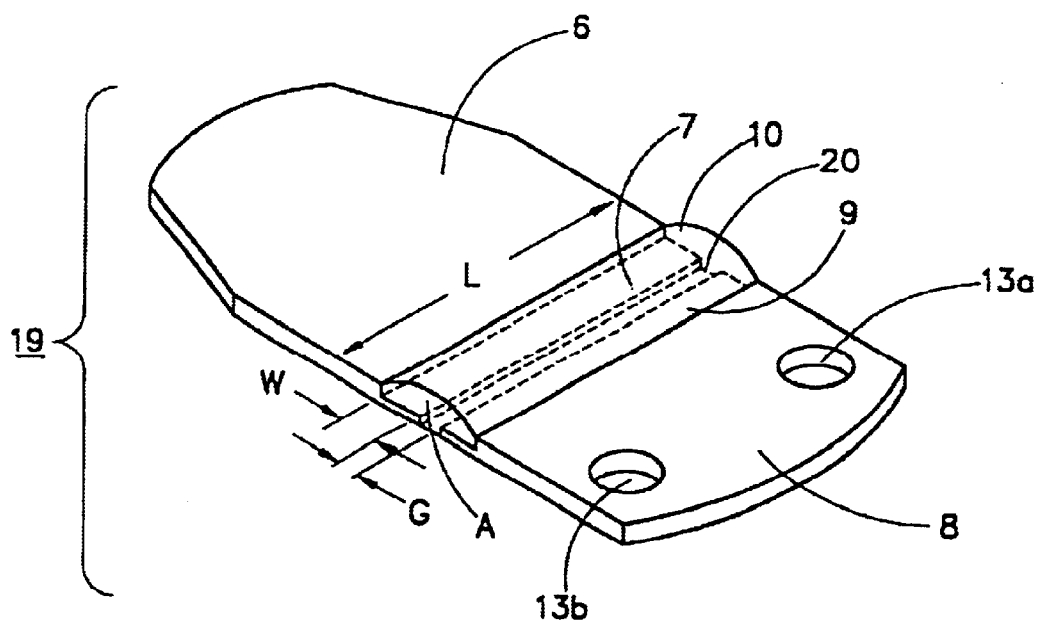
FIG. 4 shows further details of the articulated leaves and elastomeric hinge from which various embodiments of scan elements of the present invention are constructed.

Referring now to FIGS. 3 and 4, there is shown the structure of an articulated scan element 15 formed from an elastomeric hinge element 19, a mirror 1 and a magnet 4. An elastomeric hinge element 19 such as shown in FIG. 4 consists of a moveable leaf 6 that is attached to a fixed leaf 8 by means of an elastic hinge 10. The elastic hinge 10 allows the moveable leaf 6 to flex through an angle by pivoting in the area of the hinge about hinge axis 10*a*. Typically one end of the mount is held fixed such as rigid fixed leaf 8, which may be provided with mounting holes 13*a* and 13*b*. In its normal state of equilibrium both fixed leaf 8 and moveable leaf 6 of articulated scan element 15 are substantially coplanar. When a deflection force is applied in the direction of vector 3*a* or vector 3*b* to moveable leaf 6, it will flex through an angle in the corresponding direction with its tip sweeping through an arc as indicated by double arrow 2. Mirror 1 is also mounted to moveable leaf 6 so that when it is deflected the mirror will scan a light beam reflected from it. Conversely, moveable leaf 6 can be used to track a moving light beam when the deflection force is applied to moveable leaf 6.

A suitable deflection force may be generated by bonding magnet 4 to one side of moveable leaf 4 and placing electromagnetic drive element 210 (shown in FIGS. 11B and 11C) near magnet 4. An air wound coil is suitable for drive element 210 which is oriented so that when an electric current is introduced into it, the electromagnetic interaction thereby produced will deflect moveable leaf 6. Although in the embodiment of FIG. 3, magnet 4 is magnetized in the direction indicated by double arrow 5, an orientation in the direction of one of vectors 3a or 3b would also work as long as drive element 210 is positioned to promote a suitable interaction with magnet 4.

Methods of Fabrication and Properties of Articulated Mounts

Referring again to FIG. 4, there is shown an elastomeric hinge element 19 consisting of leaves 6 and 8, each of which is typically fabricated from rigid metal several mils thick. Leaves 6 and 8 may be fabricated by stamping. Standard chemical machining processes and photolithography are also ideally suited for fabricating leaves 6 and 8. Leaves 6 and 8 are separated by a gap 20 of width G. Both leaves 6 and 8 are held together by flexible elastic hinge 10. Hinge 10 is ideally formed from a resilient material which when stretched, bent or deformed will quickly resume its original shape when distortion forces are removed.

Many elastomer or rubber compounds are suited for the fabrication of hinge 10 which may be vulcanized, or bonded to each of leaves 6 and 8. Alternatively a sheet of thin rubber may be laminated to the leaves or flowable urethane rubber may be applied to them. It has been found that Room Temperature Vulcanizing (RTV) silicone compounds are admirably suited for forming hinge 10. These may be applied in a flowable or paste state by automatic dispensing methods and allowed to cure at room temperature. Many of the RTV compounds on the market such as the RTV 110 product series manufactured by General Electric, the RTV 3140 product by Dow Corning, and the TSE 399 product by Toshiba have excellent adhesion to metal or other rigid materials and when cured maintain excellent resilient properties over a broad temperature range. Various primers are also available to promote adhesion of metals and other materials to these elastomers if needed. However, when leaves 6 and 8 are formed from active metals such as beryllium-copper or phosphor-bronze, the leaves are readily fabricated by chemical machining methods and form strong bonds with many RTV elastomers without the need for primers.

In one embodiment, elastomeric hinge element 19 also includes bonding flanges 7 and 9 that have been etched into one side of leaves 6 and 8 respectively to achieve high bond strengths. Such single sided etched features are easily produced by standard chemical machining techniques as are holes, gaps and other shapes. Located between flanges 7 and 9 is gap 20 which is formed by completely etching through the metal. Each flange 7, 9 has a width W that extends from an edge of the gap 20 to an unetched edge of the corresponding leaf. Bonding flanges 7 and 9 provide for a strong lap joint when RTV elastomer is deposited between them to form hinge 10. These joints have been found to be tough and when subjected to destructive testing by pulling them apart to the point of failure the elastomer usually tears apart in the gap area with the lap bond between the elastomer and metal left in tact, thereby indicating that such joints can exceed the strength of the elastomer.

Figure 12A:
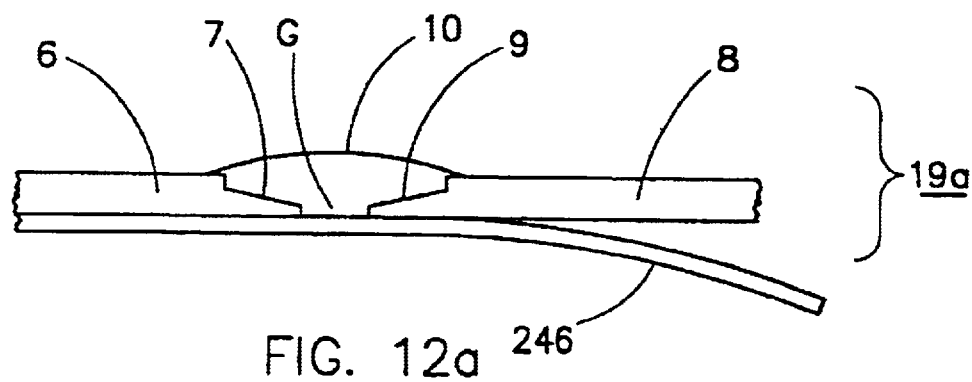
FIG. 12A shows the structure of an elastomeric hinge element having bonding flanges, and a removable film used to form the structure.
Figure 12B:
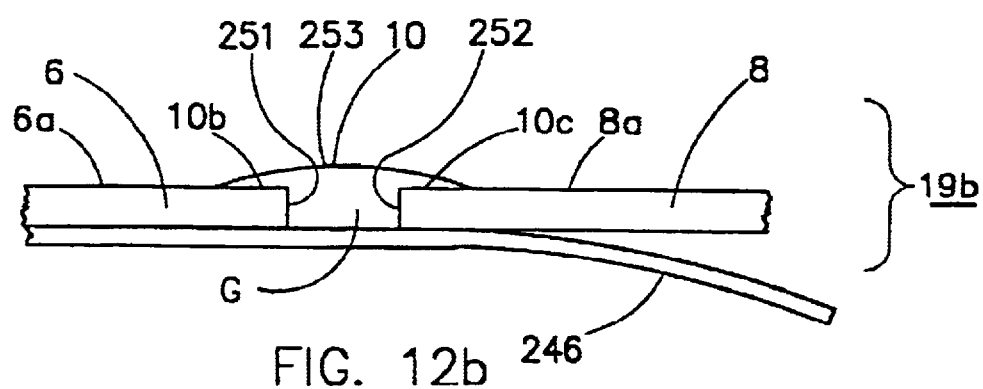
FIG. 12B shows the structure of an elastomeric hinge element having no bonding flanges, and a removable film used to form the structure.
Figure 12C:
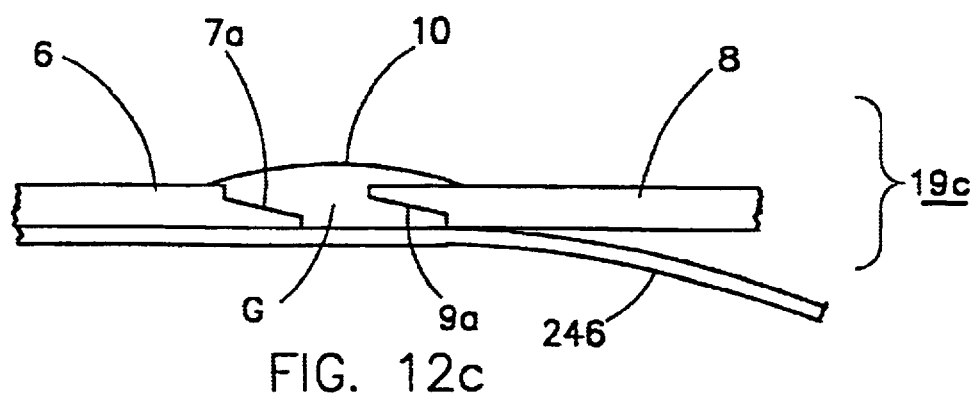
FIG. 12C shows the structure of an elastomeric hinge element having opposing bonding flanges for imparting uniform flexural characteristics to the hinge element, and a removable film used to form the structure.

Turning now to FIGS. 12a, 12b and 12c, there are shown several variations of elastomer hinge elements in accordance with alternative embodiments of the present invention. As explained more fully below, film 246 is normally removed and discarded after fabrication and is therefore not part of the completed structures. The elastomeric hinge element 19a of FIG. 12a is similar to the one just discussed above.

Elastomeric hinge element 19b of FIG. 12b has no lap joint, rather the elastomer bonding sections 10b and 10c of hinge 10' together merely overlap the edges of leaves 6 and 8, respectively. Thus, in the embodiment of FIG. 12b, the flexible hinge has a first vertical sidewall 251 that is perpendicular to the upper surface 6a of leaf 6 and abuts the end of leaf 6, a second vertical sidewall 252 that is perpendicular to the upper surface 8a of leaf 8 and abuts the end of leaf 8, and an upper surface 253 that extends above and overlaps the upper surfaces 6a, 8a of the leaves 6, 8.

The elastomeric hinge element 19c of FIG. 12c has lap joints which mate to bonding flanges 7a and 9a that are on opposite sides of leafs 6 and 8 as shown. This configuration imparts greater symmetry to the flexural properties of the hinge thus formed in case, for example, the compression strength is not quite equal to the tensile strength of the elastomer chosen to form flexible hinge 10".

Properties of Elastomeric Hinge Elements

Elastomeric hinge elements, such as hinge elements 19, 19a, 19b and 19c, have a number of useful and unique properties. These hinge elements may be fabricated with very small dimensions while at the same time maintaining very low flexural stiffness. Thus, when these hinge elements are used to form an articulated scan element such as element 15 depicted in FIG. 3, the scan element may be operated at low resonant frequencies. (Usually mechanical structures increase in resonant frequency the smaller they are made.) In a preferred embodiment, hinge elements as shown in FIG. 4 can be successfully fabricated with a hinge length L equal to 0.1 inch, flange 7 of width W equal to 0.012 inch and equal to that of flange 9, gap 20 of width G equal to 0.007 inch and both leaves 6 and 8 of thickness 0.004 inch. The addition of mirror 1 having dimensions 0.080×0.080×0.015 inches and magnet 4 having dimensions 0.040×0.040×0.040 inches as shown in FIG. 3 yields scan elements having resonant frequencies in the range of 20 Hz up to 100 Hz depending on the thickness and durometer of RTV silicone chosen for hinge 10. In alternative embodiments, the dimensions of the components in the hinge elements preferably fall into the following ranges: L equal to 0.030–0.5 inches, flange width W equal to 0.002–0.020 inches, gap width G equal to 3–20 mils, leaves 6 and 8 of thickness equal to 0.002–0.02 inches. It will be understood by those skilled in the art that elastomeric hinge elements within the scope of the present invention, such as hinge elements 19, 19a, 19b and 19c, can be fabricated using dimensions other than those set forth above.

Another useful property of the hinge elements of the present invention is that the Q of such resonant systems is quite sufficient over a wide range of temperatures to generate many wide angle oscillations when stimulated by only a single (non-periodic) short pulse as explained later.

Another valuable property of the articulated scan elements described herein is that they provide a wide angle flexure in a very short length as opposed to prior art oscillating cantilevered beam or torsion element type scan systems. As shown in FIG. 3, the mirror 1 can be positioned virtually immediately adjacent to the edge of hinge 10. Thus, the distance between the hinge axis 10a and the mirror 1 can be made quite small. In one embodiment, the distance between the hinge axis 10a and mirror 1 is about 0.014 inch. In alternate embodiments, the distance between the hinge axis 10a and mirror 1 ranges from about 0.003–0.03 inch. Also, the mirror may be mounted on the opposite side of leaf 6 or on top of the magnet with some of its mass cantilevered over hinge 10 in order to reduce the moment of inertia of the assembly.

In so much as articulated scan elements such as element 15 of FIG. 3 may be made for low frequency, low energy operation with such small dimensions as described above, they may be used to fabricate tiny scan systems useful in bar code reading. These may be easily made small enough to fit into pen size scanners or scanners small enough to fit into thin terminals the size of PCMCIA cards, palm size computers or even smaller instruments. A pen size housing suitable for use with the articulated scan elements of the present invention is disclosed in U.S. Pat. No. 5,656,805 entitled "Light Beam Scanning Pen, Scan Module For The Device And Method Of Utilization," incorporated herein by reference. A thin terminal the size of a PCMCIA card suitable for use with the articulated scan elements of the present invention is disclosed in U.S. Pat. No. 5,880,452 entitled "Laser Based PCMCIA Data Collection System With Automatic Triggering For Portable Applications and Methods Of Use," also incorporated herein by reference.

Finally, the articulated scan elements of the present invention, because of the low energy needed to drive them, can be operated effectively in a broad band mode, that is below their natural resonance frequency. This allows them to be instantly started and readied for a first complete scan within several milliseconds. This represents a period of time which is less than a complete full angle scan (e.g., the time required for the light beam to sweep through arc 99 shown in FIG. 8 during the scan interval), a valuable feature not seen in prior art devices such as that seen in FIG. 9 or cantilevered beam systems.

Structure Of Scan System

Figure 1:
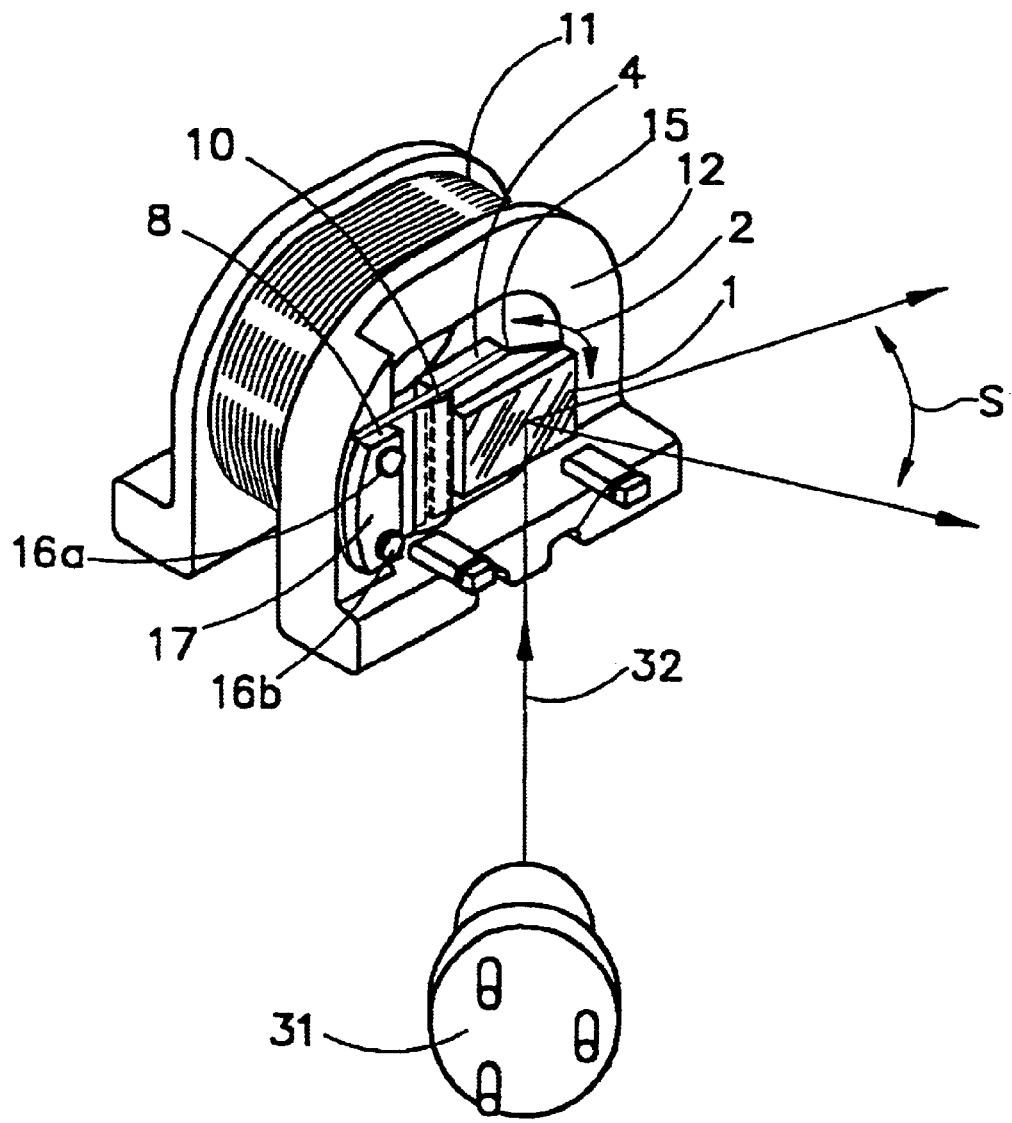
FIG. 1 shows an articulated one-dimensional scan element and a drive coil configured as a unitary structure, in accordance with the present invention.

FIG. 1 illustrates how articulated scan element 15 is used to form a scan system that is comprised of a unitary structure. Articulated scan element 15 is mounted to coil bobbin 12 by means of bosses 16a and 16b which are part of coil bobbin 12. Bosses 16a and 16b fit through mounting holes 13a and 13b (shown in FIG. 3) of fixed leaf 8. The bosses serve to reference fixed leaf 8 and may be used to rigidly attach it to the bobbin. A plate 17 may be press fitted or bonded on top of the bosses to effect a strong reliable mount. It will be understood by those skilled in the art that other methods of attaching fixed leaf 8 to bobbin 12 may also be employed such as, for example, fixturing and gluing.

To scan a light beam using the scan system of FIG. 1, a light source such as laser diode 31 producing a light beam directed along path 32 is positioned to impinge on mirror 1. When a suitable electric current is passed through coil 11, moveable leaf 6 (with magnet 5) will deflect mirror 1 causing the reflected beam to sweep through angle S. In the embodiments discussed below, coil 11 can be energized so as to cause mirror 1 to oscillate back and forth through angle S continuously or, alternatively, mirror 1 can be swept initially through the full angle S after which the amplitude of oscillations of mirror 1 will gradually diminish until leaf 6 reaches an equilibrium position. The system shown in FIG. 1 may be compactly mounted to the surface of a circuit board which can carry circuits for operating the coil, the laser and a photo detector to form a scanner suitable for reading bar codes.

In an alternative embodiment of the scan system of FIG. 1, mirror 4 may be made to track a moving beam or to sweep a target to collect light therefrom and direct it into a photo detector, a technique useful in beam tracking scanners. Also discussed later, other compact scanning structures including two-dimensional scanning devices can be formed using the elastomeric hinge elements 19, 19a, 19b, 19c of the present invention.

Mass Fabrication Of Articulated Scan Elements

Figure 5:
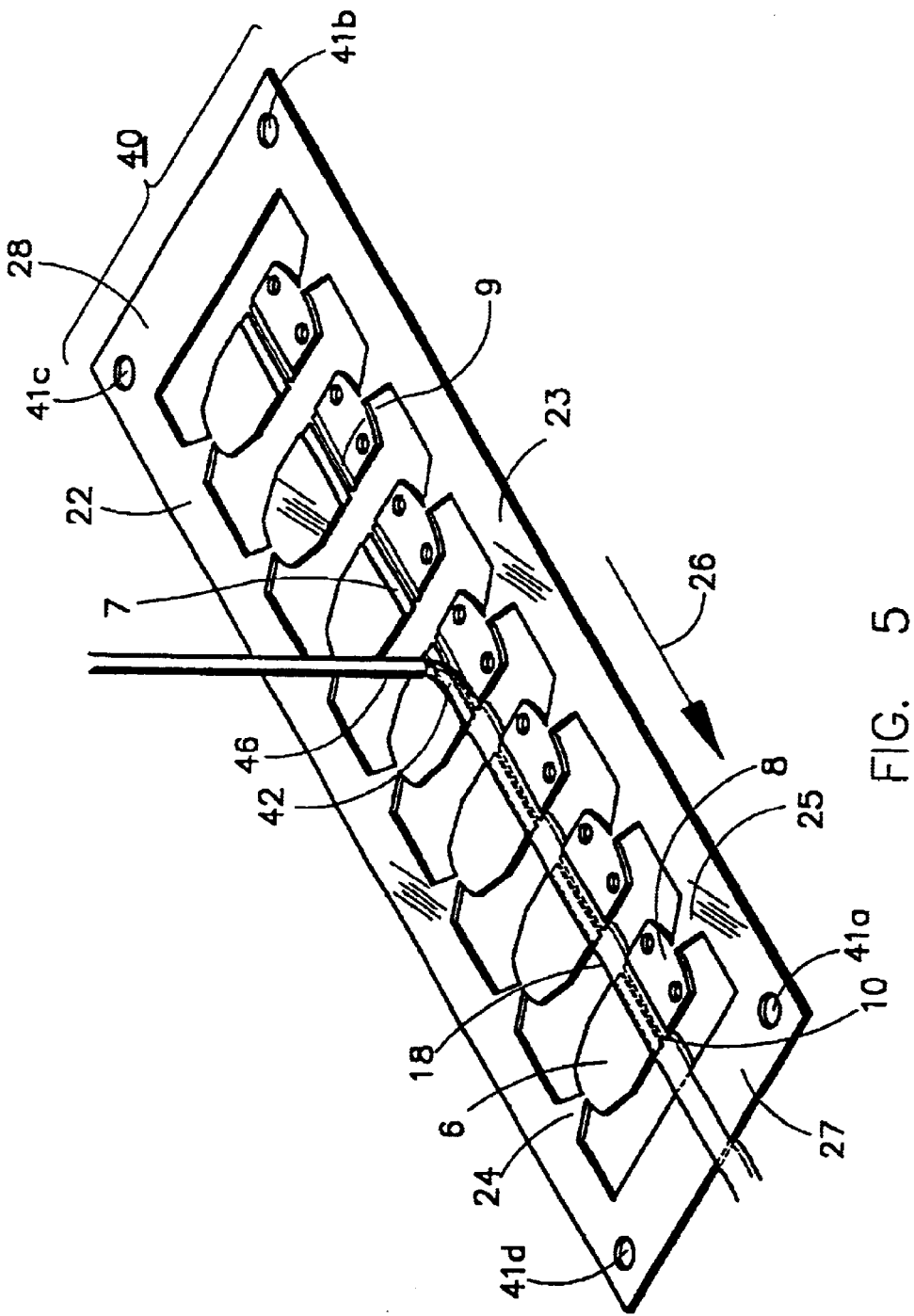
FIG. 5 shows a method for forming articulated leaves coupled by elastomeric hinges using mass production techniques, in accordance with the present invention.

Referring now to FIG. 5, there is shown a method for forming articulated leaves coupled by elastomer hinges using mass production techniques, in accordance with the present invention. Frame 40 is formed from rigid metal which, in one embodiment, is about 0.004 inch in thickness. Frame 40 includes runners 22 and 23 and ends 27 and 28. Within frame 40 are numerous leaves such as 6 and 8 which are attached to the runners by tabs 24 and 25, respectively. The numerous leaves 6, 8 may be formed within frame 40 using techniques well know in the art. For example, leaves 6, 8 may be formed within frame 40 by applying etching, machining or stamping techniques to a uniform metal substrate. Leaves 6, 8 may optionally include bonding flanges 7, 9 (as shown in FIGS. 5 and 12a), bonding flanges 7a, 9a (as shown in FIG. 12c), or alternatively, leaves 6, 8 may have regular rectangular edges for bonding with the elastomeric hinge material (as shown in FIG. 12b).

After frame 40 is formed as described above, the frame is laid on a flat surface such as polyethylene to which the elastomeric hinge material (e.g., a RTV silicone or urethane) will not bond. Frame 40 is preferably held in intimate contact with this surface by means of vacuum fixturing. Alternatively, frame 40 may be held in a fixed position by laying the frame on a low tack film tape 246 such as Nitto™ tape or clinging film such as thin polyethylene film. The vacuum fixturing or taping prevents the unwanted flow of uncured elastomer compound onto the underside of frame 40 during treatment with the elastomer material. It is also useful to provide reference holes 41a, 41b, 41c, 42d in frame 40 so that the frame can be accurately positioned during its processing.

After frame 40 is positioned on the flat surface, the elastomer which forms the hinge (e.g., hinge 10 of FIG. 4) is applied as follows. First, frame 40 is translated in direction 26 (as shown in FIG. 5) relative to dispensing tip 46 from which the elastomeric hinge material (e.g., a flowable silicone RTV elastomer) is metered out as stream 42. The stream flows into gap 20 between the unattached leafs such as leafs 6 and 8, to form a hinge such as hinge element 10 between them. In the flowable state, the elastomer is somewhat self leveling depending on its viscosity, and the elastomer therefore wets bonding flanges 7 and 9 uniformly. Since there is space between each set of leaves 6, 8, some of the elastomer may flow out from between each such set during the manufacturing process.

The degree of leveling and volume of the elastomer left in the space between leaves 6 and 8 determines the thickness of hinge 10 and this, in turn along with the cured durometer of the elastomer, determines the flexural stiffness of the resulting hinge. The relative speed of translation between dispensing tip 46 and the volume of elastomer per second in stream 42 determines the amount of elastomer laid down. In order to assure uniformity of flexural characteristics, these parameters should be held constant.

After an appropriate cure time for the elastomer has elapsed (based on manufacturer's recommendations), the array of treated hinge elements in frame 40 may be further processed. The frame 40 is removed from the vacuum carrier or the low tack film tape 246 is peeled away leaving numerous hinge elements such as, for example, articulated hinge 19 seen in FIG. 4. Just prior to peeling away the low tack tape 246, any excess elastomer around each hinge element is preferably trimmed away so that each hinge element looks similar to, for example, the one seen in FIG. 4. It is also desirable to space each hinge element equally in frame 40 so that the trimming operation may be easily automated if desired.

Figure 6:
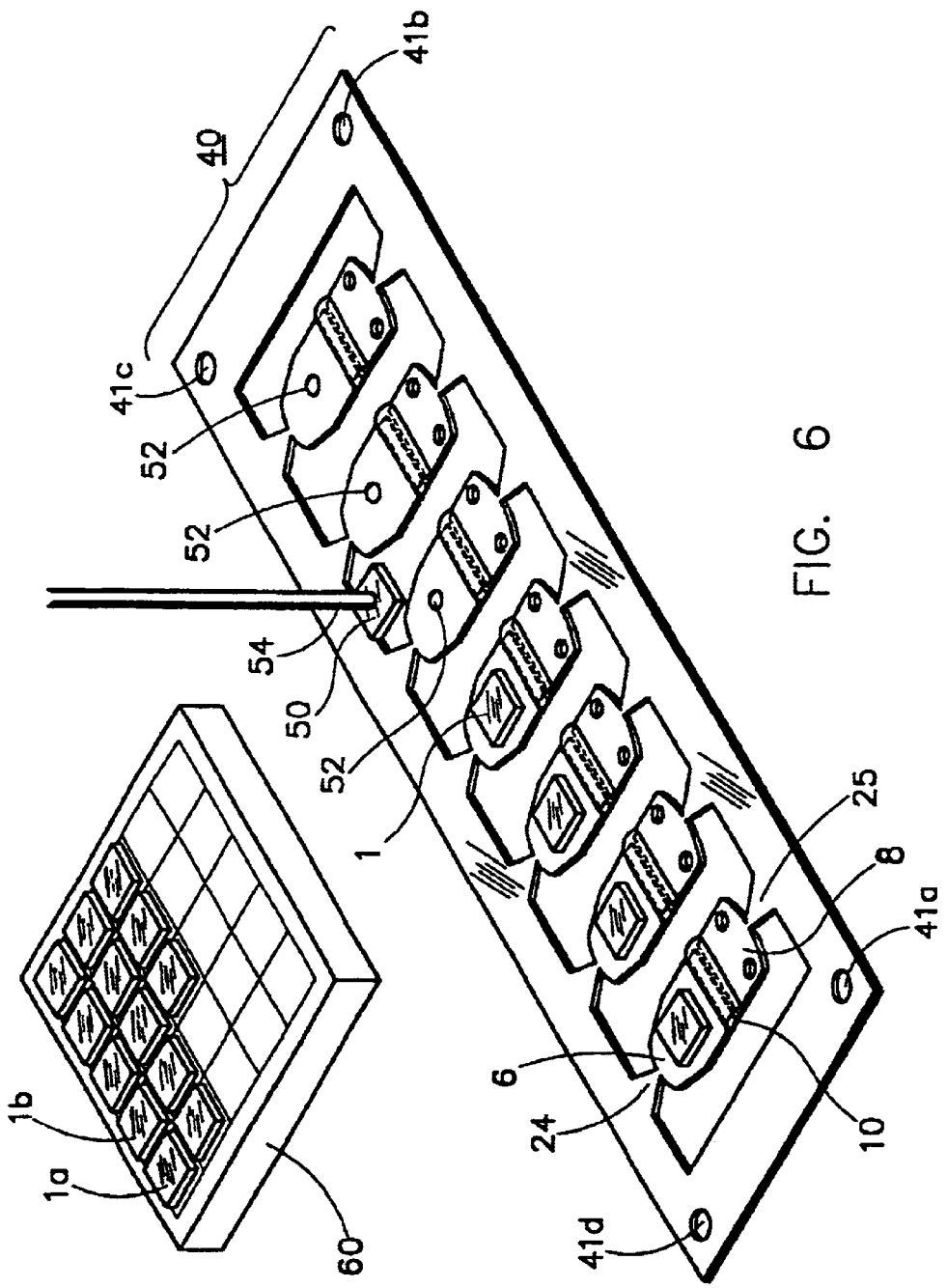
FIG. 6 shows an automated method for attaching mirrors or magnets to the leaf elements of FIG. 5.

Once the hinge elements are cured, mirrors and magnets may be applied to the moveable leafs (such as leaf 6) within frame 40. FIG. 6 shows how mirrors 1a, 1b are attached to leaves 6 using standard automatic pick and place techniques and machinery. Frame 40 is placed on a pick and place machine along with tray 60 containing mirrors such as mirrors 1a and 1b. Dispensing tip 46 (shown in FIG. 5) deposits an adhesive droplet 52 onto each moveable leaf 6. After the adhesive droplets are dispensed, vacuum pick up tip 54 picks up a mirror such as mirror 1a from tray 60 and places it firmly down onto adhesive droplet 52. This operation is sequentially carried out until a mirror has been placed onto each moveable leaf 6 in frame 40.

After the mirrors have had time to become adequately bonded in their respective positions so they will not move, magnets (such as magnet 4 depicted in FIG. 3) may be applied to the opposite side of each moveable leaf 6. The magnet assembly operation is accomplished by essentially the same process as the mirror placement operation described above using the same equipment and methods so they will not be described again. Alternatively the magnets may be placed first and the mirrors afterwards. Once both the magnets and mirrors have been placed and bonded to each of the moveable leafs 6 in frame 40, each finished scan element may be removed by severing tabs such as tabs 24 and 26 at the places where they connect the finished scan elements to the frame. Metal shearing fixtures are suited for mass detachment of the individual scan elements prior to placing them into scanners.

It should be pointed out that the planar design of frames such as frame 40 is ideally suited to low cost automatic pick and place fabrication of scan elements. In addition to the functional features afforded by chemically machined frames, valuable assembly features are obtainable through the use of such frames at no additional cost. Such additional features include, for example, etching of reference holes for fixturing, partially etched through pockets for centering small parts (these are useful for both hand assembly as well as machine assembly), the etching of position markers for human visual references, and etching of fiducials to accommodate reference features needed by machine vision techniques. These benefits coupled with the variety and utility of structure afforded by chemically machined framed parts yields a scan element assembly processes not seen in the prior art.

As discussed further below, additional structural features are contemplated which incorporate the key process steps outlined above.

Board Mountable Self Supporting Scan Elements

Figure 7:
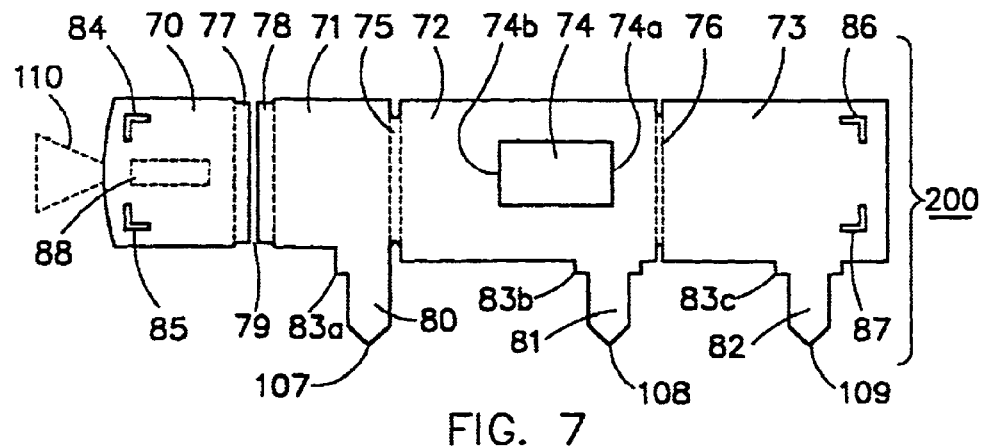
FIG. 7 shows a chemically machined chassis that can be used to form an articulated one-dimensional scan element with an elastomeric hinge, in accordance with the present invention.

FIG. 7 shows a chemically machined chassis that can be used to form an articulated one dimensional scan element with an elastomeric hinge, in accordance with a further embodiment of the present invention. FIG. 7 shows a flat chemically machined scan element chassis 200. Chassis 200 consists of moveable leaf 70 with provisions for mounting a magnet and mirror thereon. Optional visual reference angles 84 and 85 are partially etched through leaf 70 as visual aids for mirror location and placement. Dotted line 88 indicates the position on the opposite side of leaf 70 where a magnet is mounted. Bonding flanges 77 and 78 are only partially etched into moveable leaf 70 and fixed leaf 71 in the manner as previously described in connections with FIGS. 4, 12a, and 12c. Gap 79 is entirely etched away between leafs 70 and 71. Gap 79 and the areas above bonding flanges 77 and 78 form the flexible hinge when the flowable elastomer is later added thereto as described above.

Referring still to FIG. 7, grooves 75 and 76 are only partially etched through chassis 200. These grooves serve as bending aids for accurately defining angular bends, the purpose for which will later be explained. Optional visual reference angles 86 and 87 are only partially etched through second fixed leaf 73 to aid in the placement of a fixed mirror. Mounting legs 80, 81, and 82 are formed into chassis 200 and are intended to fit into holes in a suitable base such as a printed circuit board for mounting purposes. Stand off features 83a, 83b and 83c provide swing clearance for moveable leaf 70 when chassis 200 is mounted to a printed circuit board. Opening 74 is etched completely through fixed leaf 72 of chassis 200 to allow a clear passage for a scanning light beam. Tab 110 is dotted in at the end of moveable leaf 70 to hold it in place during application of elastomer to groove 79 and also during other process steps such as mirror and magnet attachment (described above) after which tab 110 is removed. At least one of leg tips 107, 108, and 109 may also temporarily serve as an attachment tab to hold the fixed portion of chassis 200 attached to a frame during preliminary handling and processing steps after which it is cut free of the frame. In an alternative embodiment, a tab similar to tab 110 may be used instead to hold fixed portion 73 of chassis 200 during the handling and processing steps described above.

Figure 8:
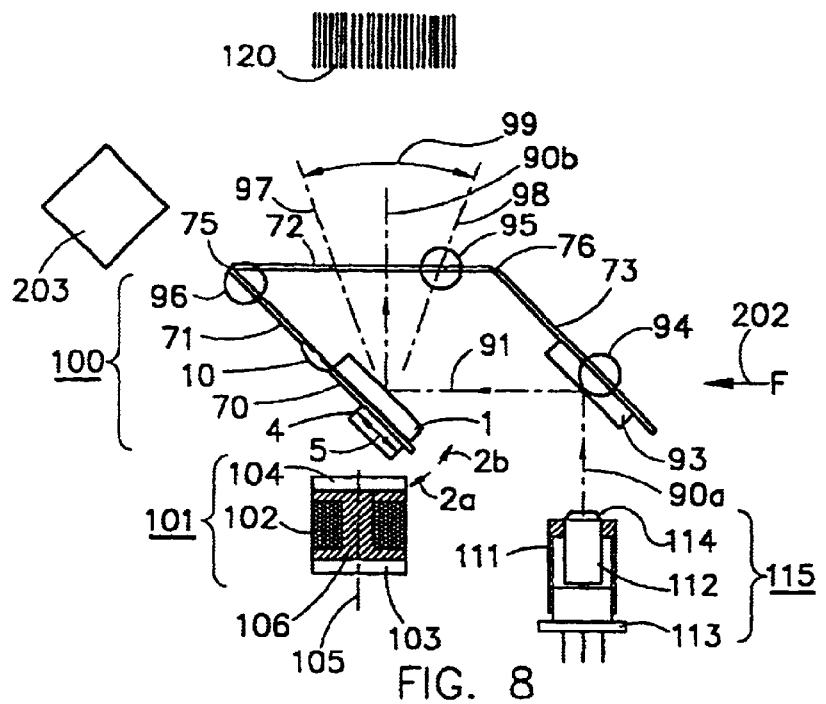
FIG. 8 shows the use of the chassis of FIG. 7 in a scan system that generates a scan line to read a bar code symbol.
Figure 9:
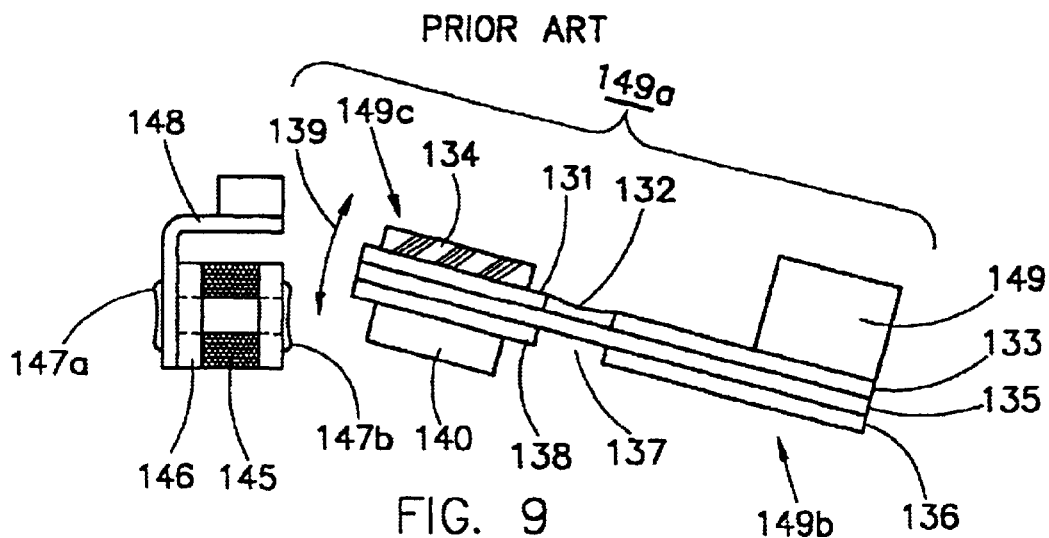
FIG. 9 shows a prior art scanning device with a hinge that is formed in part from a polyamide film.

Referring now to FIG. 8, there is shown the use of chassis 200 of FIG. 7 to form a scan system that generates a scan line to, for example, read a bar code. More particularly, FIG. 8 is a plan view of a scan system incorporating scan chassis 200 of FIG. 7. Chassis 200 is bent along grooves 75 and 76 so that legs 80, 81 and 82 fit into holes 96, 95 and 94 respectively drilled into a suitable mounting platform (e.g., a circuit board or other suitable substrate). The legs may be soldered, press fit or bonded permanently into the holes with a suitable adhesive. Since chassis 200 is bent as shown, it automatically establishes a perpendicular orientation to the platform to which it is mounted. In an alternative embodiment, chassis 200 may be mounted to the platform at some other non-perpendicular angle if desired.

Referring still to FIG. 8, the articulated scan element 100 further includes fixed mirror 93 mounted to fixed leaf 73 (visual reference angles 86 and 87 may serve as visual aids for location and placement of this mirror as described above); mirror 1 mounted to moveable leaf 70 (visual reference angles 84 and 85 may serve as visual aids for location and placement of this mirror as described above); and magnet 4 mounted to moveable leaf 70 opposite mirror 1 (at position 88 shown in FIG. 7). Flexible hinge 10 is formed of an elastic material such as RTV silicone rubber and is applied to bonding flanges 77 and 78 filling gap 79. Mounting of the mirrors, magnet and formation of the hinge are preferably accomplished by the automated pick and place methods previously described, but may alternatively be accomplished by hand.

Operation of Board Mountable Scan System

Referring still to FIG. 8, the scan system shown is preferably mounted on a circuit board or other suitable substrate. The scan system consists of articulated scan element 100 (the components of which were described in the section immediately above), coil assembly 101, laser assembly 115 and photo detector 203. In the arrangement of FIG. 8, a light beam projected into scan element 100 along entrance path 90a emerges from scan element 100 along neutral path 90b which is essentially parallel to and only insignificantly displaced from the beam entrance path 90a. Small lateral jog 91 in the beam path may be sized to have only a few hundredths of an inch of displacement. When mirror 1 is caused to swing in the directions of arc 2a or 2b, the light beam emerges from scan system 100 as a scanning beam sweeping through an angle depicted by arc 99 from position 98 to position 97 respectively.

Figure 8A:
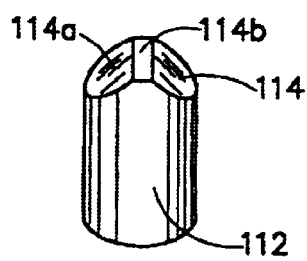
FIG. 8A shows a beam shaping element for use with the present invention.

The light beam is generated by light source assembly 115 which comprises a light source 113 and beam shaping element 112. Light source 113 is preferably a solid state laser light source, beam shaping element 112 (also shown in FIG. 8A) is preferably a lens held in reference to the light source by a holder 111. It has been found that a gradient index lens (or GRIN lens) is well suited for beam shaping element 112 and that grinding chamfers 114 onto the outer portions of the lens enhances the depth of field performance of the optical system. Other suitable GRIN lenses are disclosed in U.S. Pat. No. 5,886,332 entitled "Beam Shaping System With Surface Treated Lens And Methods For Making Same," incorporated herein by reference. When leaf 70 is in its neutral (or equilibrium) position, the beam is first projected along path 90a, reflected from fixed mirror 94 along transverse path 91 to moveable mirror 1 whereupon it is reflected outwardly along neutral path 90b. (Elastic hinge 10 attaching moveable leaf 70 to fixed leaf 71 returns leaf 70 to this neutral position where leaves 70 and 71 are coplanar when no distortion force is applied to leaf 70 by coil assembly 101.) Mirror 1 is mounted to moveable leaf 70 of scan element 100. Magnet 4 is also mounted to moveable leaf 70 behind mirror 4.

Figure 2:
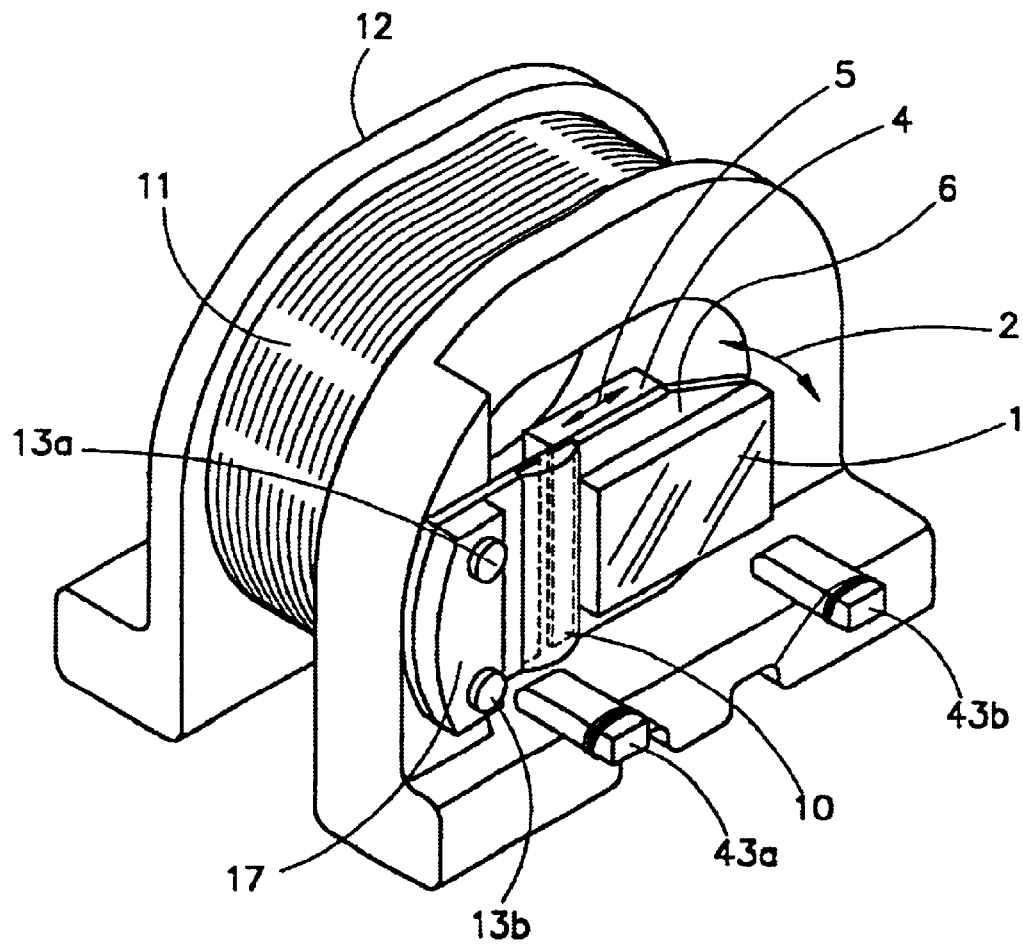
FIG. 2 shows the unitary structure of FIG. 1 in greater detail.

Electromagnetic coil assembly 101 is mounted proximate to magnet 4 and provides a distortion force that causes leaf 70 to swing in the directions of arrows 2a, 2b. Coil assembly 101 may be formed from an air core coil 102 wrapped upon bobbin 106 which may be plastic. The leads of coil 102 may be soldered directly or welded to pads on a circuit board to which it is anchored. Alternatively, traditional pins may be used such as pins 43a and 43b seen on bobbin 12 of FIG. 2 for mounting. Small air core coils are also available as surface mount coils with solderable feet 104 and 103. Surface mountable coils are machine placeable by standard automated assembly processes and are therefore preferred for automated assembly. In alternate embodiments, bobbin 106 may be made from ferrite to yield a stronger field. In this case if the moveable leaf 70 is made from a magnetic grade of steel, it is feasible to eliminate magnet 4 and still obtain a sufficient drive force by means of magnetic induction to achieve scanning action. It is also possible to highly polish moveable leaf 70 and thereby eliminate the need for a discrete mirror.

The introduction of current into coil assembly 101 interacts with the field from magnet 4 thereby generating a force causing moveable leaf 70 to pivotally flex on hinge 10 thereby causing mirror 1 to deflect a beam. When the deflection force is removed the elasticity of hinge 10 once again urges leaf 70 and mirror 1 towards their neutral position.

Opening 74 is provided in chassis 200 as seen in FIG. 7 for the beam to emerge as a scanned beam typically between end paths 97 and 98. Application of an appropriate drive current signal applied to coil 102 will scan a light beam emerging from light source 113. The scanned beam may then be used to scan a target such as bar code target 120. Photoelectric converter 203 then detects light reflected from the target and information may then be derived therefrom using methods well known in the art.

Referring still to FIG. 8, when an alternating current is applied to coil assembly 101 with an appropriate wave form such as triangle, saw tooth, sinusoidal, square waves or pulse trains, a continuous scan is obtainable for any desired period of time. The low mass of the moving parts provides low energy operation especially if scanning occurs at a natural resonant frequency of the scan element.

Very Low Energy Scanning Methods

Figure 15:
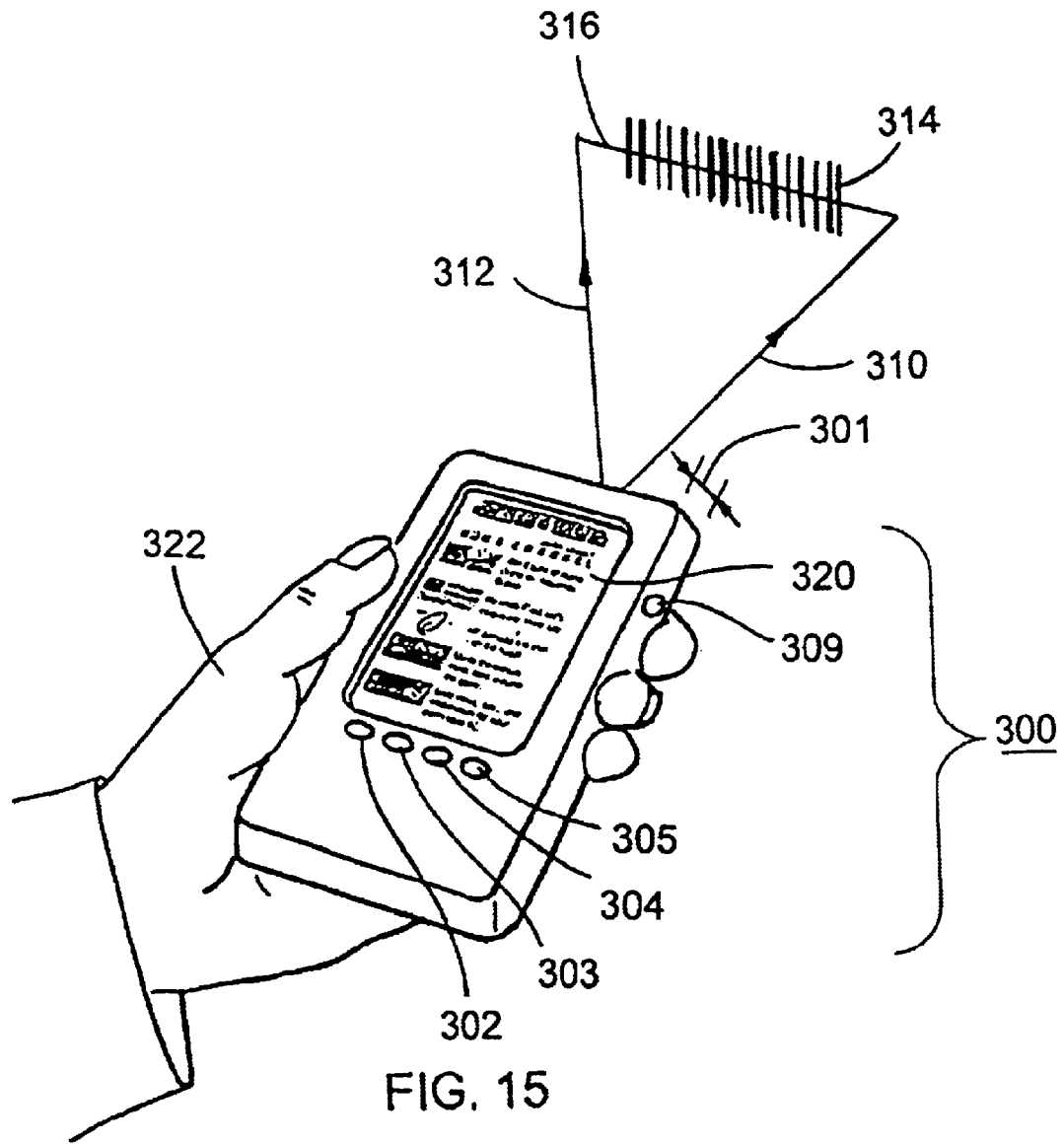
FIG. 15 shows a palm size computer having an articulated scan system integrated therewith for scanning and processing bar code data, in accordance with the present invention.

Many applications, especially portable bar code reading ones, do not require long or continuous scanning. On the contrary, only one good scan (i.e., only one sweep of the light beam through arc 99 or across the bar code symbol) is needed to read a bar code, and if redundancy is needed to achieve low error rates then only a few good scans are required. Fewer than ten scans are certainly more than sufficient even where redundant scanning is required. Executing only a few very good scans at a time saves precious battery power in portable applications, especially when used with or integrated into portable data terminals, palm type computers (as shown in FIG. 15) and the like. Novel energy saving methods of scanning are explained below.

For purposes of explanation, the scan system of FIG. 8 is described in conjunction with the timing diagrams of FIGS. 13, 13A. However, it should be noted that any of the other scan systems referred to herein may be operated in the ways described below as well as certain other scan systems. The articulated scan systems of the kinds described in the present disclosure are particularly suited to these low energy methods of operation.

As shown in FIG. 13, in one embodiment coil assembly 101 is simply energized momentarily with a single short (non-periodic) DC current pulse 452 for a very short duration of time, on the order of ten to twenty milliseconds. In response to this pulse, magnet 4 on moveable leaf 70 will execute a large deflection and immediately thereafter sweep through a full scan angle range defined by arc 99. Moveable leaf 70 carrying mirror 1 and magnet 4 will thereafter continue to oscillate about neutral position 90b such that a beam reflected from mirror 1 will continue scanning (or sweeping back and forth about its neutral position) at the natural resonance frequency of mirror 1, moveable leaf 70, magnet 4 and the flexural characteristics of resilient hinge 10 according to well understood principles of mechanics. With no further addition of current to coil 102, the oscillations about the neutral position will gradually diminish (the scan angle range will likewise diminish) and, eventually moveable leaf 70 will settle back to its equilibrium or neutral position. It has been found for scan elements of the kind depicted in FIG. 8 that 6–10 scans each having a range of 40 to 60 degrees can be obtained by delivering only the single DC pulse described above to coil 101. Typically scans having a range as low as 30 degrees or even less are useful in portable bar code scanning applications.

It should be pointed out this drive method has several distinct advantages over known prior art devices. For example, no oscillator is needed, hence there is no need to match a drive frequency with a mechanical resonant frequency; only a DC pulse is needed which may be generated by a monostable circuit having as few as three parts; no amplitude control is needed because the initial scan angle is determined by the pulse width so that only as much energy as is required for scanning is used.

In the embodiment seen in FIG. 13, the laser on time is controlled by a timing circuit which is initialized at ($t_0$)

when, for example, a user actuates the device using a momentary contact switch. At to the laser timing circuit goes on and a one shot or half monostable is triggered which delivers a brief current pulse 452 to drive coil 102 ending at ($t_1$) before the first full useful scan begins. No further energy is delivered to the coil during the scan interval. The scan interval ends at ($t_3$) and the laser is turned off. In one embodiment, the scan interval will include about 6–10 scans of gradually diminishing scan angle range as described above.

Illustrated in FIG. 13A is an alternate embodiment even more conservative of energy and peak battery current. The coil drive pulse is initiated preferably by an external momentary contact switch at ($t_0$) to set up the scan element before the laser is turned on. Thus, at to a one shot or half monostable is triggered which delivers a brief current pulse 452 to drive coil 102 ending at ($t_1$) before the first full useful scan begins. In this embodiment, the transition signaled by the end of the scan pulse occurs at ($t_1$) initiates the BEAM ON time out period lasting until ($t_3$), ending the scan sequence. The system is then ready for the next scan sequence. Related signal processing, decoder circuits and the like may be turned on at ($t_0$) or ($t_1$) shown by lines 454 and 455 respectively as is also true for the sequence of FIG. 13.

It should be noted that in the above described scan sequences, the laser beam, related signal processing, decoder circuits and the like are activated during scanning and turn off after a predetermined period of time that is unrelated to and independent of whether a bar code symbol has been successfully decoded or not during the predetermined period of time. The low energy scan techniques of the present invention save energy and are thus quite different from the control techniques described in U.S. Pat. No. 4,593,186.

In a preferred embodiment of the present invention, again referring to FIG. 8, magnet 4 is shown with double arrow 5 indicating its direction of magnetization and coil 102 oriented along axis 105, these being arranged roughly 45 degrees to each other. These have been found to be effective mutual orientations but others work well also such as orienting the direction of magnetization of magnet 104 at 90 degrees to that indicated.

For lowest energy operation, it is preferred that the short DC current pulse is delivered to coil 102 so that magnet 4 is pulled toward it rather than pushed away from it. The reason for doing so is that the lines of magnetic flux generated by coil 102 are more concentrated close to it, and therefore the current pulse will transfer more energy to the moving assembly to which magnet 4 is attached thereby requiring less battery energy to generate motion. When a short current pulse is delivered to coil 102 pulling magnet 4 towards it, a large deflection of mirror 1 will occur causing an incident beam traveling along path 91 to be reflected in the general direction of line 98 and even beyond it. To a user the scan pattern may appear very uncentered and perhaps esthetically objectionable. To avoid this appearance the size of the opening in window 74 may be formed so that gross and undesirable deflections of the scanned beam can be clipped by either or both sides 74a and 74b (shown in FIG. 7) of window 74 to provide a maximum scan angle.

As mentioned above, after the initial strong starting deflection has occurred the oscillations of mirror 4 are symmetrically centered about neutral beam path 90b. Another way of eliminating the visual effect of too large an initial beam deflection is to turn the laser on just after the current pulse has been delivered to coil 102. This will also save battery power while the beam is being justified to either of extreme beam path limits 97 or 98.

As mentioned above, for the low energy pulse mode scan methods, the scan angle immediately begins to diminish for each successive sweep after the initial single starting pulse has been delivered. It has been found that there are distinct advantages to scanning bar codes with diminishing scan angles.

When bar code targets are scanned at close range a relatively wide angle is needed to completely scan the entire code. Often users try to scan close to the target so when scanning is initiated the scan angle is large as needed. If on the other hand the target is further out a smaller scan angle is only needed to completely cover the target and the diminishing size of the scan angle will satisfy the need while at the same time more photons of light are incident on each of the bars and spaces of the target per unit time than would be the case if the scan line were far wider than necessary. This effect improves the signal to noise ratio in the photo detector which ultimately receives light reflected back from the distant target. This effect is highly beneficial because light reflected back from distant targets is much less than for close ones, hence the improved signal to noise ratio improves signal processing accuracy. Furthermore, spot speeds are less for distant targets if the scan angle is smaller and this reduces the gain band width burden placed upon amplifiers in the signal detection and processing circuitry.

Lower Energy Method of Scanner Operation

In a further embodiment, an articulated scan system like the one shown in FIG. 8 may be operated with even fewer parts and less energy than has been just described. In this embodiment, no coil assembly at all is needed, nor is current pulse circuitry, nor is magnet 4. Although mirror 1 has a mass, an additional mass is substituted for magnet 4 which need not be magnetic in order to achieve a specific resonant frequency. In this embodiment, an impact force F of very short duration (a mechanical impulse) is delivered to scan element 100 in the general direction of arrow 202. (The short impulse is represented by dotted line 451 in FIG. 13.) The impact force F may be supplied by the user of the scan device during actuation of the device.

In this embodiment, scan element 100 and laser assembly 115 are preferably mounted to a small circuit board which is easily made on the order of a half inch wide so the scanner may be mounted in a pen size bar code reading scanner. A mechanical tactile switch is operatively attached to this structure to initiate a scan sequence. When the tactile switch is depressed it clicks, thereby delivering side impact force F along the direction vector 202. Due to the inertia of mirror 1, and the mass substituted for magnet 4 mounted upon moveable leaf 7b, the mechanical impulse will cause the mirror to oscillate. The depression of the tactile switch also causes the laser and other circuitry associated with the scan system to turn on for a brief period on the order of a quarter of a second. During this time, multiple useful scans will take place and the light source will then turn off before the scan oscillations die out.

Other Scan Structures

Figure 10:
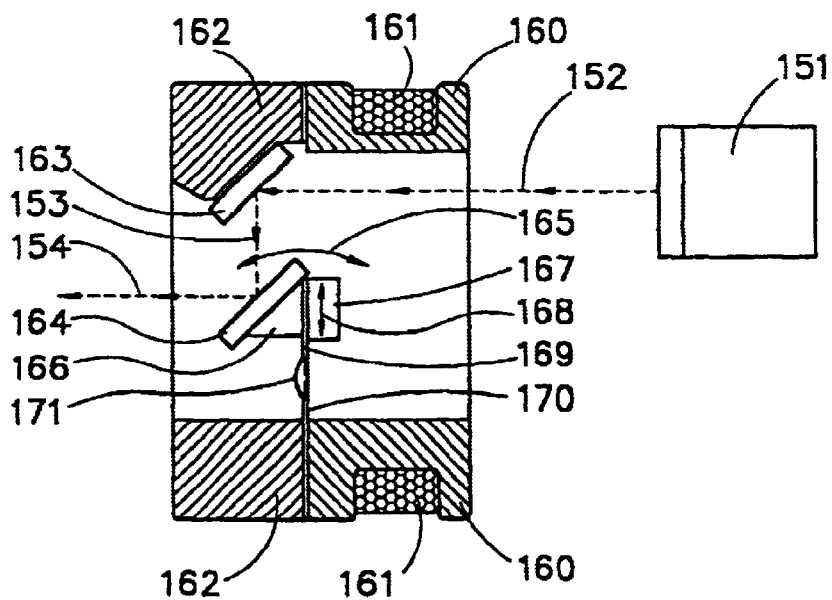
FIG. 10 shows a scan element with a drive coil, fixed mirror and moving mirror configured as a unitary structure, in accordance with the present invention.

FIG. 10 illustrates another scan element incorporating an articulated hinge element. Fixed leaf 170 is mounted firmly to bobbin section 160 wrapped with coil 161. Moveable leaf 169 is attached to fixed leaf 170 by means of elastic hinge element 171. Magnet 168 interacts with current in coil 161 as previously described. Mirror 164 is mounted to moveable leaf 169 at an angle as shown. A beam from light source 151 traveling along path 152 is reflected from fixed mirror 163 then along transverse path 153 to mirror 164 whereupon it emerges along path 154. When coil 161 is energized, mirror 164 moves in arcuate path 165 to scan the beam about neutral beam path 154.

Figure 11A:
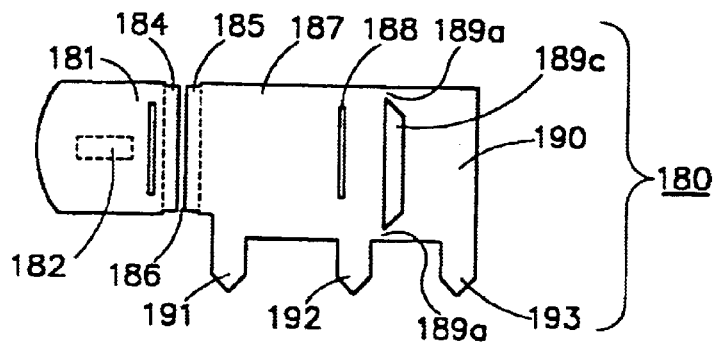
FIG. 11A shows a chemically machined chassis that can be used to construct an articulated scan element, in accordance with an alternative embodiment of the present invention.
Figure 11B:
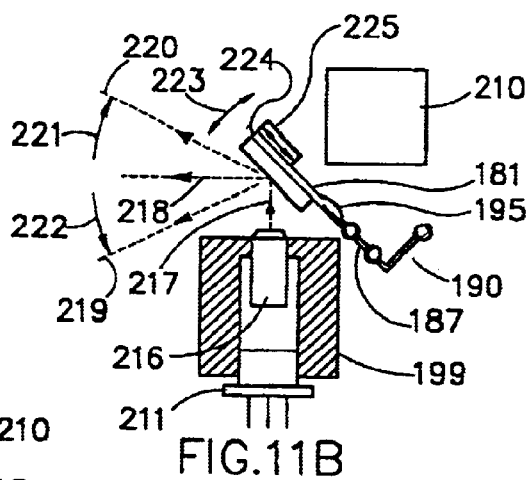
FIG. 11B shows the use of the chassis of FIG. 11A in a light beam scanner formed from a drive element and an articulated scan element.
Figure 11C:
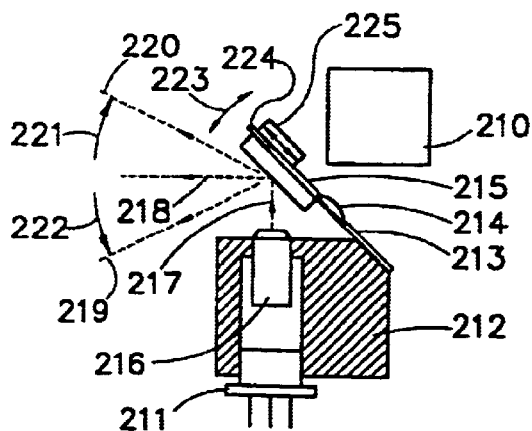
FIG. 11C shows the structure of a scan system employing an articulated scan element with a light source and drive element, in accordance with a further alternative embodiment of the present invention.

FIG. 11C illustrates a further scanner layout that utilizes an articulated hinge element in accordance with the present invention. The scanner includes a light source 211, beam forming element 216 (e.g. a gradient index lens), mount 212 to hold light source 211 in proper position with respect to beam forming element 216. A beam traveling along path 217 impinges on mirror 224 mounted on moveable leaf 215 to scan the beam alternately from path 220 to path 219 when coil assembly 210 acts upon magnet 225 which is mounted to moveable leaf 215 which flexes upon hinge element 214 as has been previously described in various forms.

The scan system of FIG. 11B is similar to that of FIG. 11C except that fixed leaf 213 has been replaced by the fixed mounting structure formed from section 187 and section 190. Details of this mounting structure, which is mountable to a circuit board, are shown in FIG. 11A. Fixed sections 187 and 190 are bent at an angle relative to each other at bend areas 189a and 189b so articulated mounting frame 180 may be easily mounted in a perpendicular relationship to a mounting platform such as a circuit board by inserting legs 191, 192, 193 through appropriate holes in the platform.

Two Dimensional Articulated Scan Systems

Figure 18:
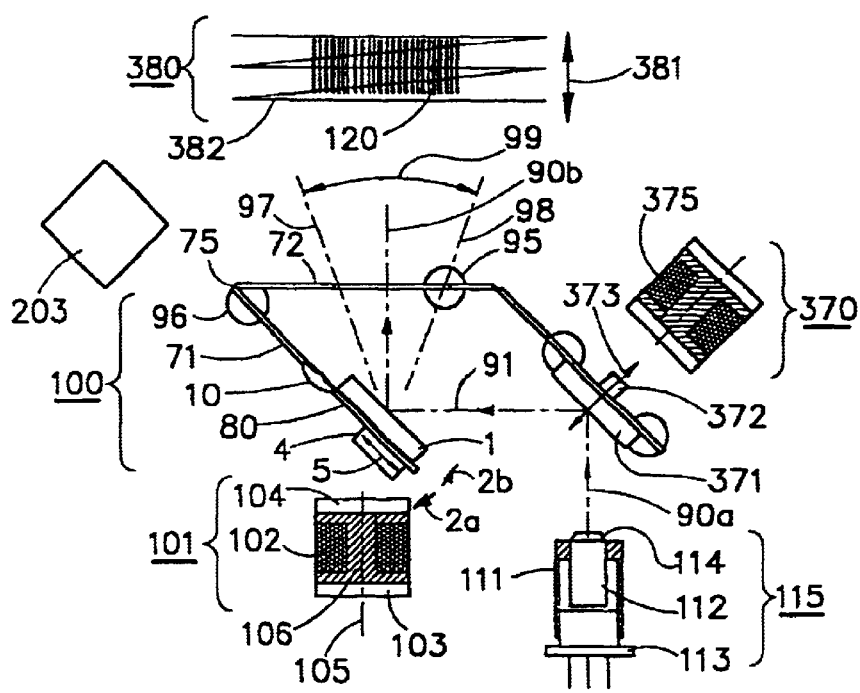
FIG. 18 shows an axial scan system with two elastomeric hinges that is capable of two-dimensional, omni and raster scanning, in accordance with a further embodiment of the present invention.
Figure 19:
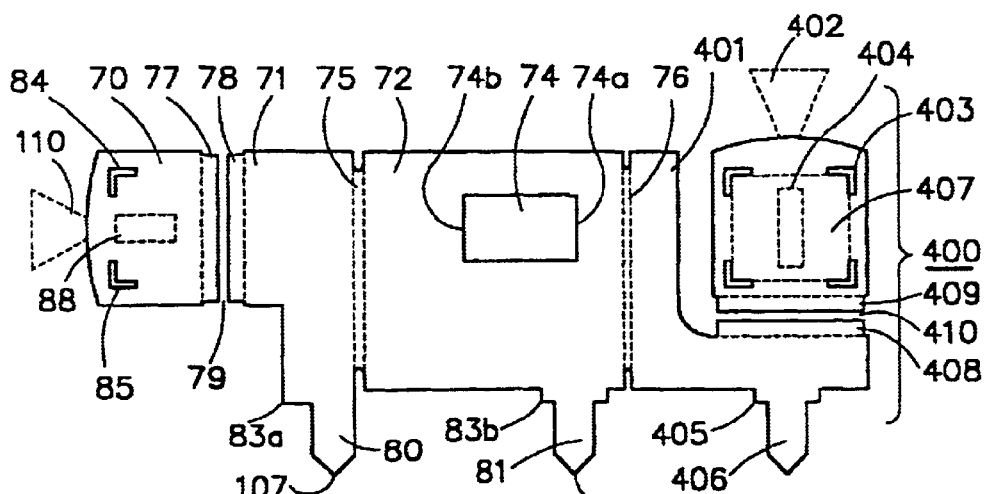
FIG. 19 shows a chemically machined chassis that can be used to build the two dimensional scan system of FIG. 18.

FIG. 19 shows chemically machined two dimensional articulated scan chassis 400. Chassis is similar to chassis 200 of FIG. 7 except that fixed section 401 does not hold a fixed mirror as does section 73. Instead section 401 has a second hinge structure consisting of moveable leaf 407 wherein gap 410 is filled with an elastomer as detailed in previous portions of this disclosure to form an articulated scan element. A mirror is mounted on leaf 407 in the area generally outlined by dotted perimeter 403 and a magnet is mounted behind the mirror in area 404. These are shown as mirror 371 and magnet 372 in FIG. 18. When magnet 372 is acted upon by coil assembly 370, mirror 371 will execute motion depicted by double arrow 373 which motion is orthogonal to that of mirror 1. With two moving mirrors, the scan system of FIG. 18 is capable of two-dimensional scanning. For example, two-dimensional raster scan pattern 380 with a vertical scan component indicated by double arrow 381 is produced by the periodic movement of second moving mirror 371. Other useful scan patterns obtainable with this scan system are Omni direction scan patterns such as Lissajous figures and the like.

Architecture for Miniature Scan Engines

FIGS. 16, 17 and 17A show the general layout of a scan engine 500 small enough to fit into the front of a pen shaped bar code reader. Scan engine 500 consists of light beam generating assembly 115, articulated scan element 100 (which may also be a two-dimensional system), drive coil 210, and decoder element 342 mounted to circuit board 340. Also mounted to circuit board 340 is light collection system 360. Light reflected from a bar code target enters optical filter 353 which removes light of unwanted wavelengths. The filtered light is conducted down optical guide 352 which transmits the light and contains it by total internal reflection whereupon it is reflected from angled surface 351 into photo detector 350. It should be noted here that filter 353 may be placed between the interface of guide 352 and photo detector 350. Also it has been found that adding an optional layer of microlouvre film 354 to the face of filter 353 will eliminate a large portion of stray light coming from unwanted directions. This addition will give better system performance in strong ambient light, especially for bright outdoor usage. (Microlouvre light control film is manufactured by The 3M Company.) Circuit block 344 represents signal processing and scanner control circuitry, and circuit block 343 represents optional circuitry for storing data in memory. Not shown are batteries which may be enclosed in the housing to power the entire scan system.

The overall structure of FIGS. 16, 17 and 17A can be compactly mounted in a generally cylindrical housing 370 having a diameter 341 on the order of 0.4 inches, configured to be held and operated in a person's hand like a pen during scanning. External switch element 371 is operatively associated with circuitry of the scan engine to initiate a scanning sequence and data processing circuitry. Which side of circuit board 340 the sub systems and components of the scan system are placed is a choice of design.

If substantially all of the parts are added to one side of board 340 and laser beam assembly 115 is reduced in diameter, then the entire scan engine 500 of FIGS. 16, 17 and 17A can be packaged into a PCMCIA computer card only 3.3 mm thick. A laser diode chip is less than 1 $mm^3$ in size and if operated in a pulse mode it needs no bulky heat sink. The PCMCIA card scanner can plug into a portable hand held computer terminal or data collector as a detachable accessory. U.S. Pat. No. 5,880,452, issued to the instant applicant, describes such a bar code scanning PCMCIA card scanner and is incorporated by reference herein.

In addition to the system components of the scan systems already mentioned, it is useful to include other optional components such as a beeper to signify that a successful decode has occurred, an LED to indicate various status conditions of the decode sequence including successful decoding and an LED which can, by blinking, down load data stored in memory into a down load station. Alternatively, light beam generator 115 may be made to blink to download the data, in which case scan mirror 1 is not moved. Of course additional externally mounted buttons may be added for data control purposes such as to erase memory contents and so on.

Terminal

Figure 14:
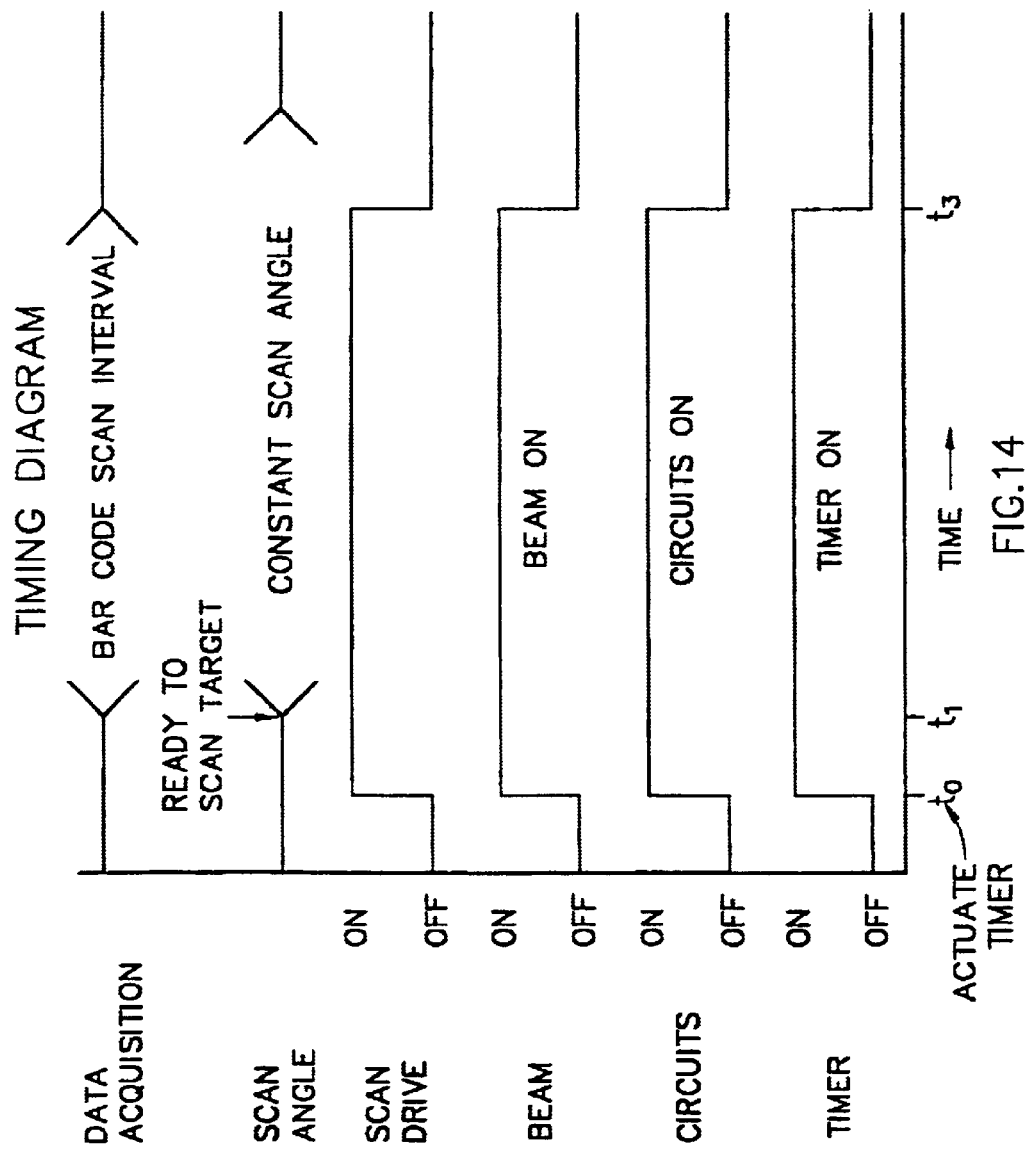
FIG. 14 is a timing diagram showing an actuation sequence for operating scan systems of the present invention in a continuous constant angle scan mode.

FIG. 15 shows palm size computer terminal 300 into which a low profile articulated bar code scanner according to the present invention like those illustrated in FIGS. 16 and 17 has been integrated preferably as a module. Such modules are sometimes referred to as scan engines. In addition terminal 300 has an information display 320, which may be a touch display on which a virtual keyboard may be presented and operated simply by touching images of keys or other features to operate the unit or manipulate information. An optional button 309 on the housing is useful for turning the unit on or for actuating the scanner therein. In a preferred mode the scanner is operated in a low power, timed out, electrical pulse mode of the kinds represented by the timing diagrams described previously in order to conserve battery power and/or to minimize peak current draw. However it may be operated in a continuous mode, a timed out-constant scan angle mode according to FIG. 14 (by applying a pulse to the drive coil from $t_0$ to $t_3$ rather than simply from $t_0$ to $t_1$), a constant angle flash mode, a pulsed flash mode or a single scan mode. (Note, a flash mode is one in which the scanner is periodically turned on and off independent of decode status.) It should also be noted that a two-dimensional scan system of the type illustrated in FIGS. 18 and 19 may also be incorporated into such a terminal. Included in the terminal is a decoder, that may reside in a dedicated microprocessor. Alternatively, the decoder may operate as software decoder that runs on the main processor of terminal 300.

In another mode of application, a scanner of the present invention can be plugged into terminal 300. An ideal device is a non-contact laser scanning pen scanner of the style described in U.S. Pat. Nos. 5,506,394 and 5,656,805 also invented by the instant applicant. In this case the decode function associated with the scanner may be either inside the terminal or the pen device itself but is used in a power saving mode which is not dependent on the decoder determining that a successful read or no read has occurred. Indication of read status may be programmed to appear on display 320 if desired or by an audible tone or blink/visible indicator or any combination of these. If no successful read occurred during an attempt, the scan cycle times out and ends of its own accord and the user simply tries again.

The previous description of the preferred embodiments is provided to enable any person skilled in the art to make and use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A scan element for scanning light in an optical scanner, comprising:
   a) a pair of leaves spaced apart in an initial position, and having edges bounding a gap; and
   b) a curable, elastomeric material overlying the edges and bonded to the edges when cured, and filling the gap to form an elastomeric hinge when cured, the leaves being interconnected through the hinge and being movable relative to each other, both away from and toward the initial position.

2. The scan element of claim 1, wherein the leaves are generally planar, sheet material.

3. The scan element of claim 2, wherein the sheet material is a rigid metal.

4. The scan element of claim 1, wherein the edges are mutually parallel and extend along a longitudinal direction, and wherein the gap has a generally constant width along the longitudinal direction.

5. The scan element of claim 1, and further comprising bonding flanges formed in the leaves and on which the elastomeric material is bonded.

6. The scan element of claim 5, wherein the leaves have generally planar, upper surfaces, and wherein the bonding flanges have stepped surfaces below the respective upper surfaces of the leaves.

7. The scan element of claim 6, wherein the stepped surfaces are generally coplanar and lie in a plane spaced from, and generally parallel to, the upper surfaces of the leaves.

8. The scan element of claim 6, wherein the stepped surfaces converge toward, but terminate short of, each other in a direction away from the upper surfaces of the leaves.

9. The scan element of claim 6, wherein the stepped surfaces are inclined relative to the upper surfaces of the leaves, and are generally parallel to one another.

10. The scan element of claim 1, wherein the curable, elastomeric material extends in a longitudinal direction lengthwise along the gap.

11. The scan element of claim 10, wherein the curable, elastomeric material is a silicone compound.

12. The scan element of claim 1, wherein the leaves have upper surfaces, and wherein the curable, elastomeric material, when cured, has a raised outer surface that is elevated above the upper surfaces of the leaves.

13. The scan element of claim 1, wherein the curable, elastomeric material cures at room temperature.

14. The scan element of claim 1, wherein the curable, elastomeric material is the only material in the gap.

15. The scan element of claim 1, and further comprising a scan component mounted on one of the leaves for joint movement therewith.

16. The scan element of claim 15, wherein the scan component is a generally planar mirror mounted in surface area contact with said one of the leaves.

17. The scan element of claim 15, and further comprising a drive component mounted on said one of the leaves for jointly moving the scan component and said one of the leaves.

18. The scan element of claim 17, wherein the drive component is a permanent magnet.

* * * * *